US012659408B2

(12) United States Patent　　　　　(10) Patent No.:　US 12,659,408 B2
Rocha, III et al.　　　　　　　　　　　(45) Date of Patent:　　Jun. 16, 2026

(54) COMPUTE SYSTEMS AND PROCESSES FOR VIDEO MESSAGES

(71) Applicant: Let's Roll Marketing LLC., Cockeysville, MD (US)

(72) Inventors: Thomas Rocha, III, San Antonio, TX (US); Darren C. Fransella, San Antonio, TX (US)

(73) Assignee: Let's Roll Marketing LLC., Cockeysville, MD (US)

( * ) Notice: Subject to any disclaimer, the term of this patent is extended or adjusted under 35 U.S.C. 154(b) by 0 days.

(21) Appl. No.: 19/318,971

(22) Filed: Sep. 4, 2025

(65) Prior Publication Data

US 2026/0006131 A1　　Jan. 1, 2026

Related U.S. Application Data

(60) Provisional application No. 63/690,709, filed on Sep. 4, 2024.

(51) Int. Cl.
H04M 3/53　　　　(2006.01)
H04M 3/533　　　(2006.01)
H04M 7/12　　　　(2006.01)

(52) U.S. Cl.
CPC ..... H04M 3/5315 (2013.01); H04M 3/53341 (2013.01); H04M 3/53391 (2013.01); H04M 7/126 (2013.01)

(58) Field of Classification Search
CPC ........... H04M 3/5315; H04M 3/53341; H04M 3/53391; H04M 7/126
See application file for complete search history.

(56) References Cited

U.S. PATENT DOCUMENTS 6,226,362 B1 * 5/2001 Gerszberg ............. H04M 1/247
　　　　　　　　　　　　　　　　　　379/88.19
7,983,401 B1 * 7/2011 Krinsky ................ H04M 3/527
　　　　　　　　　　　　　　　　　　455/466

(Continued)

FOREIGN PATENT DOCUMENTS

EP　　　　　4280596 A1　　11/2023

OTHER PUBLICATIONS

"Receive FaceTime calls on iPhone", Apple Support (FaceTime feature), 2023.

(Continued)

*Primary Examiner* — Olisa Anwah
(74) *Attorney, Agent, or Firm* — Outlier Patent Attorneys, PLLC

(57)　　　　　　　ABSTRACT

A system and method for handling missed video calls by allowing a receiver to create a personalized video, voice, or no message to be played when they are unable to answer a call. The system determines the receiver's availability and, if unavailable, retrieves and streams the prerecorded message to the caller. After the message, the caller is given the option to leave a video voicemail message or hang up. If a video voicemail is left, the system stores the message and notifies the receiver. The invention enhances the communication experience by providing a more engaging and personalized way to handle missed video calls, with messages tailored for business or personal purposes. The system can be implemented using various technologies, such as video conferencing software, mobile applications, or web-based platforms.

20 Claims, 9 Drawing Sheets

(56) References Cited

U.S. PATENT DOCUMENTS

| | | | | |
|---|---|---|---|---|
| 8,831,573 | B2 | 9/2014 | Sigmund et al. | |
| 8,917,824 | B2 | 12/2014 | Zubas et al. | |
| 9,276,971 | B1* | 3/2016 | Walker | H04L 65/1059 |
| 10,862,863 | B2* | 12/2020 | Moore | H04L 61/2589 |
| 10,958,790 | B2 | 3/2021 | Norman et al. | |
| 2003/0043260 | A1* | 3/2003 | Yap | H04N 21/4788 |
| | | | | 348/14.06 |
| 2004/0203608 | A1 | 10/2004 | Osann, Jr. | |
| 2005/0283813 | A1* | 12/2005 | Jamail | H04M 3/5315 |
| | | | | 725/110 |
| 2005/0286519 | A1 | 12/2005 | Ravikumar et al. | |
| 2006/0133590 | A1 | 6/2006 | Jiang | |
| 2008/0273077 | A1* | 11/2008 | Cowherd | H04M 3/5315 |
| | | | | 348/14.06 |
| 2009/0092234 | A1* | 4/2009 | St. Onge | H04L 12/1818 |
| | | | | 379/88.13 |
| 2011/0112901 | A1 | 5/2011 | Fried et al. | |
| 2012/0281819 | A1* | 11/2012 | Madhavapeddi | H04M 3/53358 |
| | | | | 379/88.14 |
| 2014/0168344 | A1* | 6/2014 | Shoemake | H04N 7/147 |
| | | | | 348/14.01 |
| 2016/0330599 | A9 | 11/2016 | Sigmund et al. | |
| 2017/0019247 | A1 | 1/2017 | Iyer et al. | |
| 2021/0264195 | A1 | 8/2021 | Ingram et al. | |
| 2021/0321002 | A1 | 10/2021 | DiMaria et al. | |
| 2022/0076851 | A1 | 3/2022 | Kamangar | |
| 2022/0353367 | A1* | 11/2022 | Chau | H04N 5/76 |
| 2023/0156111 | A1* | 5/2023 | Pham | G06K 7/1095 |
| | | | | 348/14.02 |
| 2023/0230683 | A1 | 7/2023 | Boyko et al. | |
| 2024/0187526 | A1* | 6/2024 | Scopes | H04L 63/0861 |

OTHER PUBLICATIONS

"Set up voicemail on your mobile phone", AT&T Wireless Customer Support / iPhone, 2007.
International Search Report and Written Opinion by ISA/US of PCT/US25/56365, dated Jan. 28, 2026.
International Search Report and Written Opinion by ISA/US of PCT application No. PCT/US25/44821 dated Nov. 19, 2025.

* cited by examiner

COMPUTE SYSTEMS AND PROCESSES FOR VIDEO MESSAGES

CROSS-REFERENCE TO RELATED APPLICATIONS

This application claims the benefit of U.S. Provisional Application 63/690,709 filed Sep. 4, 2024, titled "COMPUTE SYSTEMS AND PROCESSES FOR VIDEO MESSAGES," which is herein incorporated by reference in its entirety.

BACKGROUND

Field of the Art

Telecommunications, software

Discussion of the State of the Art

Conventional video calling systems generally lack a receiver-side capability to present, upon a missed or unanswered video call, a receiver-authored prerecorded video message that is automatically played to the caller. Instead, when a video call is not answered, the caller typically encounters a generic text or audio notice and may at most leave an audio message or end the call. As a result, the caller does not receive the receiver's intended visual message at call time, leaving a communication gap in the video call context.

Conventional video-calling platforms provide caller-initiated features that, when a video call is unanswered, allow the caller to record and deliver a short video message to the receiver via the platform's messaging channel. While such caller-originated follow ups add visual context, they generally do not furnish a receiver-side capability to preauthor and automatically present a prerecorded video message to the caller at the time of non-answer. As a result, the missed call state remains one-sided at call time from the receiver's perspective.

Conventional video-calling and messaging platforms provide "instant video message" features that enable a caller, upon a missed call or when immediate visual communication is desired, to quickly record and transmit a short video clip to the receiver via the platform's messaging channel. While this may be faster than sending a separate video file, the functionality is caller-originated and generally lacks a receiver-side mechanism to preauthor and automatically present a personalized prerecorded message at the time the call is not answered. Accordingly, the unanswered call state remains one-sided at call time.

Conventional video conferencing platforms provide mechanisms to record meetings and to post video messages within associated chat spaces for later review. While these features mitigate the loss of real-time interaction in group or meeting contexts, they are not integrated to handle individual unanswered video calls. When a direct video call is not answered, such platforms generally do not automatically present a receiver-authored prerecorded video message to the caller at call time; instead, the caller typically relies on followup through separate communication channels, which can introduce delays.

Conventional enterprise support systems may handle high call volumes by directing customers to prerecorded video tutorials or help content hosted outside the active calling session, thereby reducing repeated livesupport interactions. However, such content is typically not triggered automatically in response to a missed or unanswered video call and is generally not tailored to the individual caller's identity or context. Consequently, these approaches lack call-time immediacy and personalization and do not provide a receiver-side, automatically presented, prerecorded video response at non-answer.

Accordingly, conventional solutions for missed or unanswered video calls generally fail to provide a unified, call-time mechanism that both (i) automatically presents a receiver-authored prerecorded video message to the caller when the call is not answered and (ii) integrates a path for the caller to respond with a video message. In addition, existing approaches typically omit features needed to address accessibility and customers support workflows, for example, call-time visual messaging usable by hearing impaired individuals, so key user needs remain unmet.

SUMMARY

The invention provides a computer implemented system that handles unanswered video calls by automatically applying the receiver's predefined preferences to (i) stream a receiver-authored prerecorded video message to the caller, (ii) play an audio message, or (iii) suppress playback (no message), as configured by the receiver. In one embodiment, a Video Voicemail Server selects the appropriate option using a receiver-defined decision tree stored in a Video Voicemail Database, enabling personalized handling such as different messages for business versus personal contacts. After any receiver message is presented, the caller is prompted on the caller device to record a video message or terminate the call.

This invention addresses prior limitations by enabling a receiver of a video call to preauthor messages, differentiated, for example, between business and personal contexts, and to have the appropriate prerecorded message automatically presented to the caller when the call is unanswered. In one embodiment, a Video Voicemail Server uses a receiver-defined decision tree stored in a Video Voicemail Database to select and stream the receiver's prerecorded video message at call time. After playback, the caller device is prompted to (i) record and submit a video reply, (ii) leave an audio-only message, or (iii) decline to leave a message and end the call. This call-time presentation and optional caller reply reduce information loss otherwise associated with missed video calls.

The invention provides call-time continuity for unanswered video calls by automatically selecting and streaming a receiver-authored prerecorded message to the caller at the time the call is not answered. In one embodiment, a Video Voicemail Server applies a receiver-defined decision tree stored in a Video Voicemail Database to choose the appropriate message (e.g., business vs. personal) and present it immediately, thereby approximating salient aspects of an answered session by conveying visual and auditory context together with optional instructions. This call-time presentation, coupled with the integrated option for the caller to leave a video reply, reduces information loss otherwise associated with generic "unavailable" notices and supports both individual and enterprise communication scenarios.

The present invention relates to computer implemented systems and methods for handling unanswered video calls. In one embodiment, when an incoming video call is not answered, a Video Voicemail Server applies a receiver-defined decision tree stored in a Video Voicemail Database to automatically select and stream a receiver-authored prerecorded message to the caller. The receiver may preconfigure handling modes, including (i) a prerecorded video greeting, (ii) an audio-only message, or (iii) suppression of playback (no message), according to the receiver's preferences.

The system includes a user-facing User Interface Engine through which the receiver records and stores one or more personalized, prerecorded messages (e.g., for business or personal contexts) in a Video Voicemail Database. When an incoming video call is not answered, a Video Voicemail Server consults the receiver's decision tree to automatically select and stream the appropriate prerecorded message to the caller at call time.

After the prerecorded receiver message is presented at call time, the system automatically displays, on the caller device, a prompt to either (i) record and submit a video voicemail (in some embodiments, an audio-only reply) or (ii) terminate the call. If the caller elects to record, a Video Voicemail Server, via the User Device Interface, captures the media stream and stores the resulting file—together with associated metadata such as sender identity, receipt time, and duration—in a Video Voicemail Database for later retrieval by the receiver (e.g., via a message center).

Embodiments provide a call-time, automated handling of unanswered video calls that personalizes the interaction for both parties. When the receiver does not answer, a Video Voicemail Server applies to a receiver-defined decision tree stored in a Video Voicemail Database to automatically select and stream a receiver-authored prerecorded message to the caller, conveying unavailability and optional instructions. After playback, the caller device is prompted to record a video reply or end the call, enabling a two-sided visual exchange in the missed call scenario and reducing the information loss associated with generic notices.

In various embodiments, the system is realized as (i) an integration with a video-calling platform, (ii) a mobile application, or (iii) a web-based service. A Video Voicemail Server coordinates unanswered call handling with client applications, while a Video Voicemail Database-optionally backed by cloud object storage-persists both the receiver's prerecorded messages and any caller video replies together with associated metadata (e.g., sender identity, timestamps, and duration). These stored artifacts are retrievable by authorized users via a User Interface Engine.

In some embodiments, the call session may be transported over a variety of network types, including terrestrial broadband, wireless cellular, satellite-based links, or hybrid combinations thereof. Because the disclosed system reuses the same negotiated signaling and media security context (e.g., SIP, session initiation protocol, dialog identifiers or WebRTC PeerConnection state), the transport medium is agnostic. Accordingly, the same-session playback and reply capture operations apply across wired, wireless, and non-terrestrial infrastructures, including satellite constellations and mixed backhaul environments.

The invention also addresses two representative use case classes—accessibility for hearing impaired users and customer support workflows—by applying the same computer-implemented mechanism described herein: when a video call is unanswered, a Video Voicemail Server uses a receiver-defined decision tree stored in a Video Voicemail Database to automatically select and stream a receiver-authored prerecorded video appropriate to the context, and then prompts the caller to submit a video reply or end the call.

When a video call is unanswered, the system may, per the receiver's preferences, automatically select and stream a receiver-authored prerecorded outgoing video that includes a signer or sign-language interpretation (e.g., picture-in-picture or inset). In some embodiments, an AI processor generates automatic closed captions for video messages to improve accessibility. Calltime visual presentation provides a communication mode not available with audio-only calls.

Customer support workflows. For enterprises receiving numerous calls about a simple fix, the Video Voicemail Server, applying a receiver-defined decision tree (e.g., via Rules Engine with assets in a Video Voicemail Database), can route callers at non-answer to a solution video. If a caller to a live video support line is presented with a leave message prompt, the User Device Interface enables the caller to record a brief video illustrating the issue (e.g., a broken part or malfunctioning device), which is stored with metadata for staff review prior to a return call.

In some embodiments, the receiver's decision tree applies caller category rules to select an appropriate prerecorded message. For example, a healthcare system may present different triage greetings to oncology patients and maternity patients, or an enterprise may greet a returning customer with a personalized acknowledgment while presenting new prospects with a general intake video. The Rules Engine evaluates caller identity, category, and context, and the Video Voicemail Server streams the corresponding prerecorded asset. The Backend System persists category identifiers and triage dispositions with the stored reply for reporting and subsequent routing.

Sales intake and lead capture. When a video call is unanswered, the system may automatically select and stream a prerecorded greeting that invites the caller to provide information relevant to a business or sales inquiry. The caller's video reply is captured and stored in the Video Voicemail Database together with metadata such as caller identifier, receipt timestamp, and decision-rule identifier. The Backend System generates a structured lead record that may include a transcript or keyword extraction, a scoring value derived from reply features, and any applicable consent or retention flags. In some embodiments, the record is transmitted via authenticated API, Application Programming Interface, or webhook to an external customer relationship management system, and reporting functions log message play counts and response rates for later analysis.

The system may operate as a designed first step for handling callers identified as dissatisfied or high conflict. A prerecorded human-facing greeting is streamed to the caller to provide context and reduce perceived hostility. The caller is then prompted to leave a video reply describing the complaint or issue, which is stored in the Video Voicemail Database with associated metadata. The Backend System may tag the reply with escalation indicators, and in some embodiments routes such flagged records to specialized review queues so that staff can review the message asynchronously and de-escalate before live engagement.

The prerecorded video greeting presented to the caller may feature a recognizable company spokesperson, mascot, or brand character. Associating the unanswered-call experience with a familiar spokesperson conveys continuity and brand identity even when live staff are unavailable. The system records a spokesperson asset identifier with metadata for each session, and the Backend System aggregates usage and response metrics across different spokesperson assets. In some embodiments, comparative reporting is performed to evaluate engagement, including message play counts and reply rates associated with alternative spokesperson presentations.

In various embodiments, when a video call is unanswered, a Video Voicemail Server applies a receiver-defined decision tree (e.g., via Rules Engine using data in a Video Voicemail Database) to automatically select and stream a receiver-authored prerecorded message to the caller without requiring contemporaneous interaction by either party. The configuration supports differentiated prerecorded responses (e.g., business vs. personal) and accessibility features such as closed captioning and sign-language interpretation insets or picture-in-picture. A Backend System performs reporting and accounting functions, generating records and metrics (e.g., message play counts, caller response rates) associated with call handling. Collectively, these operations provide an automated, decision rule driven method for handling missed video calls while preserving flexibility for both personal and enterprise use cases.

In summary, embodiments provide computer-implemented systems and methods that, when a video call is unanswered, automatically select and stream a receiver-authored prerecorded message to the caller based on a receiver-defined decision tree. In one embodiment, a Video Voicemail Server applies rules (e.g., via Rules Engine) using data in a Video Voicemail Database, then prompts the caller device to record a video reply (or, in some implementations, an audio-only reply) or end the call. A User Interface Engine supports configuration of multiple messages (e.g., business/personal) and retrieval of caller replies, while a Backend System records usage metrics and call metadata. The same mechanism supports accessibility features (e.g., captions, sign-language insets) and customers support workflows, providing an automated, configurable call-time handling of missed or unanswered video calls.

The disclosed systems improve computer-network operation for video telephony by reusing the same negotiated signaling and media security context to (i) stream a receiver-authored prerecorded video at non-answer and (ii) switch media direction in-session to capture a caller reply-without creating a new dialog or PeerConnection. This design reduces signaling round-trips, avoids a new ICE/DTLS or SRTP setup, lowers end-to-end latency, and preserves session continuity, yielding a call-time user experience that more closely approximates an answered video call than conventional voicemail workflows that redirect to a new session. These improvements support a wide range of applications including accessibility, customer support, sales intake, triage, escalation management, and branded spokesperson presentations, while the invention remains directed to the underlying technical mechanisms rather than any specific business domain.

The present invention may comprise intercepting, by a video-voicemail server, a video communications session initiated by a user device over a communications network, the video communications session being initiated between at least a sender user device and a recipient user device, the sender user device associated with a sender address, wherein the intercepting comprises extracting sender address from incoming call signalling and establishing a session identifier that maintains continuity throughout subsequent routing and messaging operations without terminating the video communications session; querying to obtain a recipient user decision tree instructions from a video-voicemail database, wherein the decision tree instructions comprise hierarchical rule structure comprising sender classification rules, time-based routing rules, and/or availability dependent routing rule; computing an availability status by querying the recipient user device and receiving an availability response from the recipient user device; algorithmically generating routing instructions by comparing the decision tree instructions, sender address, and the computed availability status, wherein the routing instructions comprise instructions for streaming a pre-recorded message through the video-voicemail server; selecting a pre-recorded media file from a plurality of pre-recorded media files stored in the video-voicemail database in substantially real time based on user decision tree instructions and sender address; executing the routing instructions by retrieving the selected pre-recorded media file from the video-voicemail database and streaming the selected pre-recorded media file from the video-voicemail database through the video-voicemail server to an audio/visual interface associated with the sender user device; wherein the video communication session is maintained without termination throughout the various routing and streaming steps and wherein the various routing and streaming steps are associated with the same session identifier from interception to streaming of the selected pre-recorded media file, and wherein the video-voicemail server, the video-voicemail database, the sender user device, and the recipient user device operate with the same session identifier for the entire video communication session; and transmitting a notification to the recipient user device.

Additionally the invention may comprise, wherein the video communications session is a Session Initiation Protocol, SIP, dialog, and streaming the selected pre-recorded media file further comprises delivering a prerecorded video as early media by sending a Session Progress (183) with Session Description Protocol (SDP) and streaming the pre-recorded video over the negotiated SRTP path without answering toward the caller, and.

Additionally the invention may comprise, further comprising capturing a reply in the same session by issuing an in-dialog re-INVITE or UPDATE that requests upstream media from the sender device.

Additionally the invention may comprise, wherein the decision tree is keyed to the sender address and includes conditions selected from time of day, specific date, caller identity, caller category, and/or a no-message option.

Additionally the invention may comprise, wherein the selected pre-recorded media file may comprise a pre-recorded video message, a text message sent to the sender through SMS, and/or prompting the sender to record a video message.

Additionally the invention may further comprise automatically prompting the sender user device to capture and transmit response data; and storing the response data on the video-voicemail database.

Additionally the invention may comprise, wherein the response data comprises recording a video and/or audio message.

Additionally the invention may further comprise applying an artificial intelligence processor to generate a written transcript and/or a written description of the video and/or audio message.

Additionally the invention may further comprise enabling playback of the response data within a message center on the recipient user device.

Additionally the invention may comprise, wherein the video communications session is a WebRTC PeerConnection, and streaming the selected pre-recorded media file further comprises injecting a prerecorded video as a remote media track on the existing connection.

Additionally the invention may further comprise capturing a reply by replaceTrack and/or addTransceiver to obtain media from the sender device without creating a new connection or performing a new ICE/DTLS handshake.

Additionally the invention may further comprise capturing and storing session data in the database, wherein the session data comprises start and end times of calls, the parties involved, and any specific actions taken during the call.

Additionally the invention may further comprise enabling access to the call data to an administrator user.

Additionally the invention may further comprise calculating billing information based on the call data and automatically generating invoices and/or reports associated with the call data.

Additionally the invention may comprise, wherein streaming the selected pre-recorded media file to the sender user device further comprises encrypting the prerecorded message prior to transmission.

Additionally the invention may comprise, wherein encrypting the prerecorded message comprises applying Advanced Encryption Standard (AES), Rivest-Shamir-Adleman (RSA), and/or third party platforms.

Additionally the invention may further comprise applying a machine learning algorithm to automatically modify the decision tree in response to the recipient's behavior and/or the responses of the senders to different automated responses.

Additionally the invention may comprise, wherein the user decision tree instructions further comprise a wait time preference and wherein algorithmically generating routing instructions further comprises a delay based on the wait time preferences.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
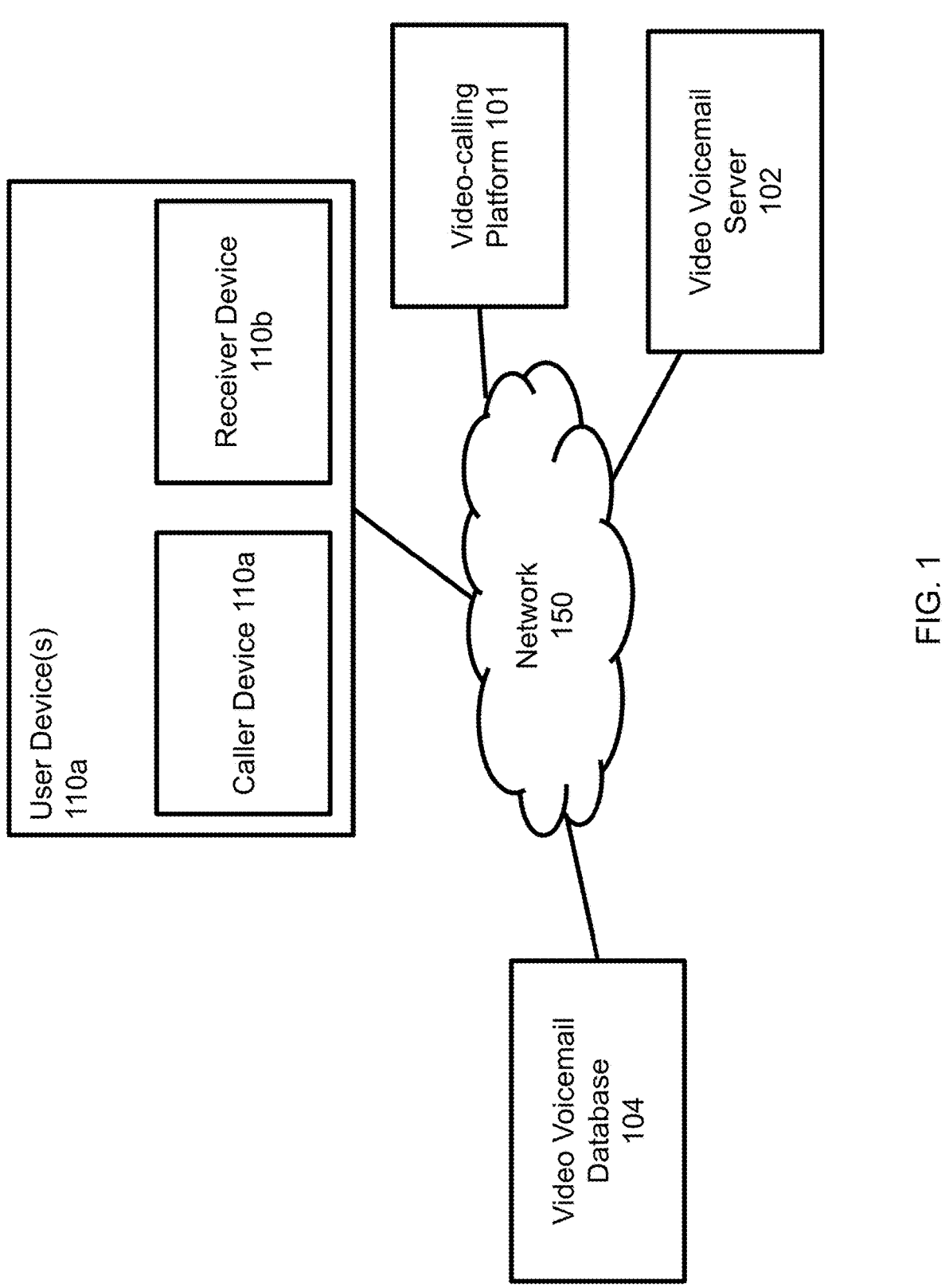
FIG. 1 illustrates a network architecture for the process of showing a video caller a video response if the receiver is not available, and ability for the caller to leave a video message. in accordance with an exemplary embodiment of the invention.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Steps described for a given aspect are not limited to occurring once per execution. Depending on the embodiment, steps may be omitted, repeated, or performed multiple times within a process or method.

Where a single device is described, multiple devices may be substituted to perform the same function. Where multiple devices are described, a single device may alternatively perform the functions of the plurality The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Network Architecture

FIG. 1 illustrates an exemplary embodiment of the process for showing a video caller a video response if the receiver is not available, and the process that allows a caller to leave a video message. FIG. 1 illustrates the overview of the video voicemail system with the User Devices 110a connecting via the Network 150 to the Video Voicemail Database 104 and the Video Voicemail Server 102 to complete a video voicemail call. The various components described herein are exemplary and for illustration purposes only and any combination or subcombination of the various components may be used as would be apparent to one of ordinary skill in the art. The system may be reorganized or consolidated, as understood by a person of ordinary skill in the art, to perform the same tasks on one or more other servers or computing devices without departing from the scope of the invention.

FIG. 1 depicts an example network environment in which User Devices 110a and 110b communicate via Network 150 with the Video Voicemail Server 102 and a Video Voicemail Database 104. In operation, when a video call to a receiver is unanswered, Server 102 consults receiver-defined preferences (e.g., a decision tree) and automatically selects and passes the meta data to the Video Voicemail Server 102 that streams a receiver-authored prerecorded video message to the caller; after playback, the caller may be prompted to record a video reply for storage in Database 104. The illustrated arrangement is exemplary and non-limiting; functions may be distributed, consolidated, or reorganized across one or more servers or computing devices without departing from the described embodiments.

In some embodiments, a Video Voicemail Server 102 may be deployed in a centralized or distributed configuration and handles incoming video call signaling from a Video-calling Platform and manages the receiver's missed call preferences. Upon receipt of a video call targeting a receiver, Server 102 determines the receiver's availability and, if the call becomes unanswered based on configured wait time and availability criteria, applies the receiver-defined decision tree, for example, via a Rules Engine 210 using data in a Video Voicemail Database 104, to automatically select an action. Exemplary actions include retrieving and streaming a receiver-authored prerecorded video greeting to the caller (e.g., via Network Routing Interface 202 and User Device Interface 204) or routing the call to the receiver when available.

The Video Voicemail Server 102 manages the receiver's decision tree, which specifies, for example, per-caller wait time preferences and the handling mode for an unanswered call, namely, presentation of a prerecorded video greeting, an audio-only message, or suppression of playback (no message). The Server 102 may automatically evaluate the decision tree, select the configured action, and, when playback is required, retrieves and forwards the information to a Video-calling Platform that streams the corresponding prerecorded asset to the caller. The server 102 may also store and retrieve receiver-authored prerecorded messages so that the content presented to the caller accords with the receiver's preferences.

When a video call becomes unanswered based on the receiver's status and wait time preferences, a Video Voicemail Server 102 may automatically evaluate the receiver's decision rules and select and forward the information to the Video-calling Platform to stream the appropriate prerecorded message to the caller-retrieving the asset from a Video Voicemail Database 104 that may be backed by file or object storage and delivering it via the Network Routing Interface 202 and User Device Interface 204. After playback, the caller device 110a is prompted to (i) record a video voicemail or (ii) terminate the call. If the caller records a video voicemail, Server 102 captures the media stream (via User Device Interface 204) and persists the file together with associated metadata (e.g., filename, storage location, sender identity, receipt timestamp, and duration) in the Video Voicemail Database 104. In various embodiments, a Video Voicemail Server 102 is deployed on dedicated server hardware, on cloud-based infrastructure, or in a hybrid configuration.

In alternative implementations, the Video Voicemail Server 102 may be deployed in a distributed configuration in which multiple cooperating instances handle incoming video call signaling and decision tree evaluation (e.g., via a Rules Engine 210) for unanswered calls, while sharing a Video Voicemail Database 104 that persists receiver-authored prerecorded assets and associated metadata. Such deployments support horizontal scalability and fault tolerance. In another alternative, the functionality of Server 102 is integrated into an existing video-calling platform or mobile application backend, exposed as services or APIs that are invoked upon a non-answer event to automatically select and stream the appropriate pre recorded message (e.g., using Network Routing Interface 202 and User Device Interface 204) and to capture any caller video reply, leveraging the host platform's infrastructure and user base.

In one embodiment, a Video Voicemail Database 104 provides the persistent, queryable store for the video voicemail system. The database may maintain (i) decision tree data and receiver preferences (e.g., per-caller rules and wait time thresholds), (ii) call records and associated metadata (e.g., caller/receiver identifiers, timestamps, duration, and storage locations), and (iii) media assets—receiver-authored prerecorded greetings and caller video (or audio-only) replies—or references to such assets in underlying storage. A Video Voicemail Server 102, via a Video Voicemail Data Server Interface 206, stores and retrieves these records so that a Rules Engine 210 can evaluate the receiver's decision tree at call time and retrieve the selected asset. In some embodiments, the database 104 also persists AI generated artifacts (e.g., a transcript or textual description) associated with stored messages for later review through a User Interface Engine 208. Receiver authored prerecorded greetings and caller video voicemails are persisted in a Video Voicemail Database 104, which may utilize local disks, network-attached storage (NAS), or cloud object storage for media assets together with associated metadata (e.g., identifiers, timestamps, and locations) to support subsequent retrieval and streaming. These deployment and storage options are illustrative and non-limiting.

The Video Voicemail Database 104 persists the data required to operate the video voicemail system. When a video call becomes unanswered according to the receiver's status and configured wait time preferences, a Video Voicemail Server 102 automatically triggers evaluation of the receiver's decision tree (e.g., via a Rules Engine 210 using data retrieved through a Video Voicemail Data Server Interface 206). Using records such as but not limited to, per-caller identity mappings, the decision tree selects which receiver-authored prerecorded message to present. Server 102 then retrieves the selected asset from Database 104 and forwards it to a Video-calling Platform which streams it to the caller via the Network Routing Interface 202 and User Device Interface 204. After playback, any caller response, video or, in some embodiments, audio-only, is captured and stored in Database 104 together with associated metadata (e.g., filename, storage location, sender identity, receipt timestamp, and duration) for later access by the receiver; if the caller declines to leave a message, the system records a corresponding no-message disposition linked to the call record.

In an embodiment, the Video Voicemail Database 104 is a logical persistence layer that may be realized over different storage backends. For example, Database 104 may index decision tree preferences, call records, and identifiers/locations of prerecorded greetings and caller replies while the underlying media assets reside in cloud object storage to support authorized, multidevice access over the network. In other embodiments, Database 104 and its media store may reside on a local server (e.g., NAS) or, in device-resident deployments, on the receiver's device thereby limiting access to that device. Regardless of the backend, Database 104 accessed via a Video Voicemail Data Server Interface 206 provides the persistent, queryable records used at call time to retrieve and stream the selected asset and to store any caller response with associated metadata.

User Devices 110a, the caller device, and 110b, the receiver device, (also referred to herein as "user devices 110") are client endpoints with connectivity to Network 150 and are used by callers and receivers to initiate and receive video calls, render streamed media, record replies, and manage preferences. Exemplary user devices include smartphones, tablets, laptops, desktop computers, and in vehicle infotainment/navigation systems, or other networked computing devices equipped with a camera, microphone, display, speaker, and wired and/or wireless network interfaces. A user device executes a web browser or a dedicated client application that communicates with a Video-calling Platform, Video Voicemail Server 102 (e.g., via a User Device Interface 204) to submit call requests, receive notifications, stream receiver-authored prerecorded messages, and capture caller video (or, in some embodiments, audio-only) replies. User devices may originate data requests and provide data to the system over Network 150, including configuring user preferences and retrieving stored video voicemails.

In one embodiment, caller device 110a functions as the communication endpoint used by the caller to initiate a video call and to generate a video voicemail message when the recipient is unavailable. To perform these functions, caller device 110a executes software capable of establishing a network connection to the video voicemail system, transmitting call setup requests, receiving prerecorded responses streamed from the recipient's decision tree, and capturing video or audio data through integrated hardware components such as cameras and microphones. The device then transmits the captured data stream over the network using established communication protocols, such as Session Initiation Protocol (SIP) or WebRTC, for delivery to the system. In alternative embodiments, the caller device 110a may be implemented as a smartphone, a tablet, a laptop, a desktop computer, or any other computing device capable of supporting video communication. The device may run a dedicated application, a web-based client, or standard telecommunication software, and may utilize either wired or wireless connectivity, including Wi-Fi, cellular, or broadband links, to perform its functions.

In one embodiment, recipient device 110b functions as the endpoint designated to receive an incoming video call and to display notifications and stored video voicemail messages when the recipient is unavailable. The recipient device 110b may be a server or video call hosting server. To perform these functions, recipient device 110b communicates with the video-calling platform and video voicemail system by receiving call setup requests, responding with availability status information, and playing back stored sender messages through its display and audio interfaces. The device may further execute software that allows the recipient to configure decision tree instructions, record and upload prerecorded video or audio greetings, and review metadata, transcripts, or descriptions of received messages. Communication between the device 110b and the video voicemail system may be carried out using protocols such as SIP, WebRTC, or HTTPS, depending on the deployment environment. In alternative embodiments, recipient device 110b may be implemented as a smartphone, a tablet, a laptop, a desktop computer, or any network-enabled device capable of supporting video communication. The device may utilize dedicated client applications, web-based interfaces, or integrated video conferencing software, and may connect to the network using wired Ethernet, Wi-Fi, or cellular technologies.

User device(s) 110 include, generally, a computer or computing device including functionality for communicating (e.g., remotely) over a network 150. Data may be collected from user devices 110, and data requests may be initiated from each user device 110. User device(s) 110 may be a server, a desktop computer, a laptop computer, personal digital assistant (PDA), an in- or out-of-car navigation system, a smart phone or other cellular or mobile phone, or mobile gaming device, among other suitable computing devices. User devices 110 may execute one or more applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 150. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user device 110 may enable a user to enter a Uniform Resource Locator (URL) or other address directing the web browser to a server, and the web browser may generate an Encrypted HyperText Transfer Protocol (HTTPS) request and communicate the HTTPS request to the server. The server may accept the HTTPS request and communicate to the user device 110 one or more Hyper Text Markup Language (HTML) files responsive to the HTTPS request. The user device 110 may render a web page based on the HTML files from the server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application obtains data from the network 150 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTPS or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

System Architecture

Figure 2:
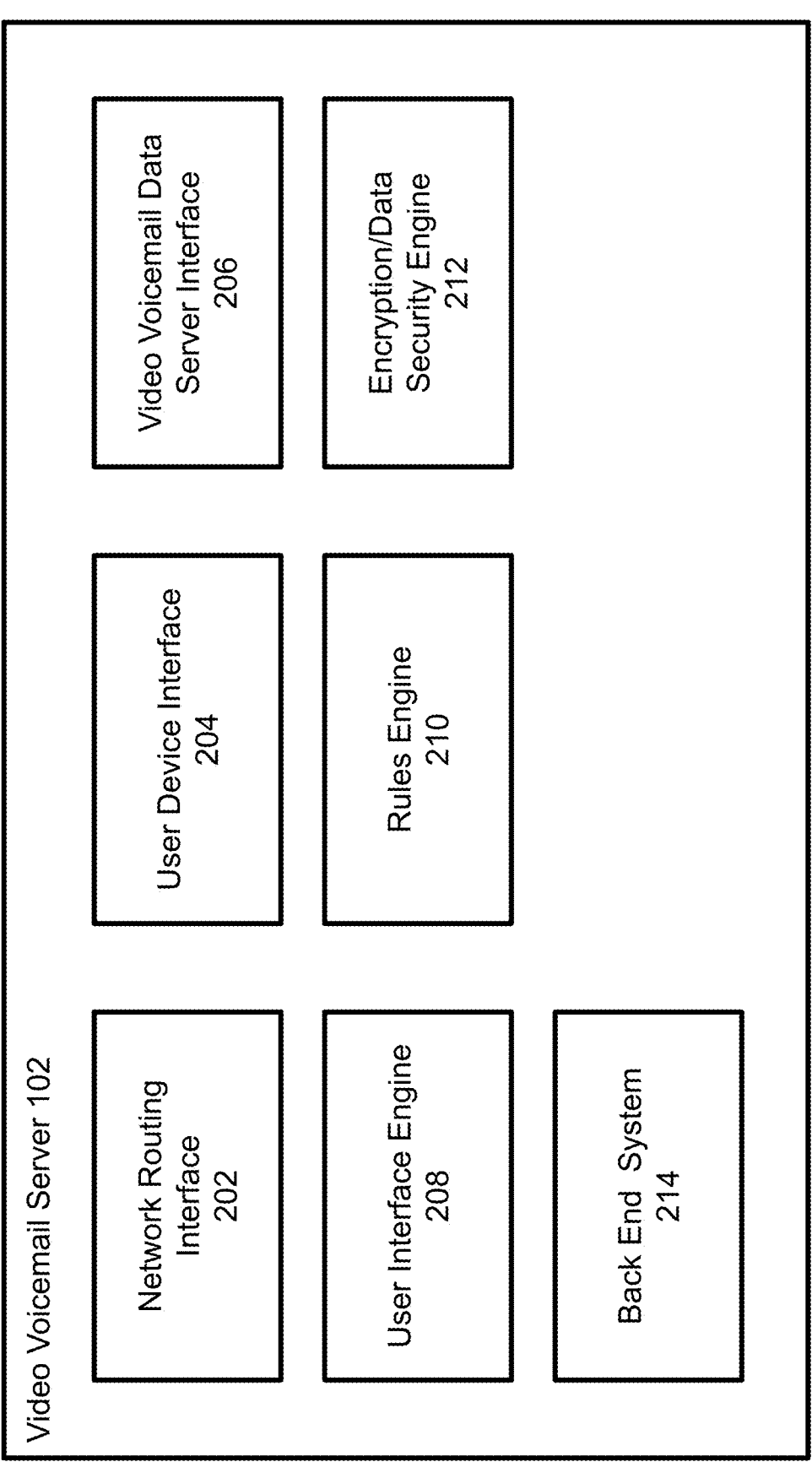
FIG. 2 illustrates a system architecture for the process for showing a video caller a video response if the receiver is not available, and ability for the caller to leave a video message. in accordance with an exemplary embodiment of the present invention.

FIG. 2 illustrates an exemplary embodiment of the server for showing a video caller a video response if the receiver is not available, and ability for the caller to leave a video message. The server may comprise a Network Routing interface 202, User device Interface 204, Video Voicemail Data Server Interface 206, User Interface Engine 208, Rules Engine 210, Encryption/Data Security Engine 212, and Back End System 214. The system necessary to successfully accept, route and manage a video call including the status of the receiver, wait time, an unattended video response along with its video response and reporting. The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met.

In one embodiment, a Network Routing Interface 202 provides the ingress/egress gateway between the video voicemail system and external networks. Interface 202 terminates and establishes call signaling sessions and associated media paths, receives incoming video call setup messages addressed to a receiver, and forwards call metadata (e.g., receiver identifier and caller address) to a Video Voicemail Server 102 for availability and decision tree evaluation. When the receiver is available, Interface 202 routes the call to the receiver device 110b; when the call becomes unanswered, Interface 202 carries the stream of the receiver-authored prerecorded message selected by Server 102 to the caller, and supports subsequent caller reply capture via the User Device Interface 204.

The Network Routing Interface 202 operates at the boundary of Network 150 to receive incoming video call signaling and associated metadata, extract identifiers (e.g., caller address and the receiver's identifier or video identifier), and forward a normalized call context to a Video Voicemail Server 102 for availability and decision tree evaluation via Rules Engine 210. Interface 202 then establishes the appropriate routing: when the receiver is available, it connects the call to the receiver's User Device 110b; when the call becomes unanswered under configured wait time criteria, it directs the call into the video voicemail handling flow and maintains the media path for the server to retrieve and stream the selected receiver-authored prerecorded message to the caller (e.g., via a User Device Interface 204)

In various embodiments, a Network Routing Interface 202 negotiates call signaling and media paths using protocols appropriate to the endpoint environment for example, SIP for native clients or WebRTC for browser based clients. Interface 202 terminates the corresponding signaling, establishes the media session, and forwards a normalized call context to a Video Voicemail Server 102 for availability and decision tree evaluation. When a call becomes unanswered, Interface 202 maintains the media path for the server to retrieve and stream the selected receiver-authored prerecorded message to the caller (with caller-reply capture supported via a User Device Interface 204). In some deployments, Interface 202 operates as a gateway between SIP and WebRTC environments, translating signaling and relaying media. Transport level security (e.g., TLS, Transport Layer Security, for SIP signaling and DTLSsecured media for WebRTC) may be employed in coordination with an Encryption/Data Security Engine 212.

The Network Routing Interface 202 may support multiple deployment topologies including peer-to-peer, client-server, cloud-based, and hybrid configurations, so that the system can be installed in diverse environments and interoperate with existing network setups. In each case, Interface 202 terminates call signaling on Network 150, establishes and maintains the media path between User Devices 110a and the Video Voicemail Server 102 (or between endpoints when the receiver answers), and, when a call becomes unanswered, forwards a normalized call context to Server 102 and maintains the media route for the server to retrieve and stream the selected receiver-authored pre recorded message from a Video Voicemail Database 104; Interface 202 likewise supports capture of any caller reply. Integration may be achieved through standard gateways or proxies, without limiting the architecture.

In one embodiment, the Network Routing Interface 202 cooperates with an Encryption/Data Security Engine 212 to help ensure privacy and integrity for both call signaling and media. For native clients, Interface 202 may terminate SIP over TLS for signaling and negotiate SRTP for the media path; for browser-based clients, it may establish WebRTC sessions secured with DTLS-SRTP. For web interactions, HTTPS/TLS may be used. Interface 202 authenticates and authorizes endpoints—e.g., via certificate based (mutual TLS) or token-based mechanisms—and enforces access control policies (such as role-based rules or allow/deny lists) before establishing or continuing the media path. These measures are applied to the streaming of receiver-authored prerecorded messages as well as to any caller reply capture performed via a User Device Interface 204.

In one embodiment, a User Device Interface 204 is a server side interface through which the Video Voicemail Server 102 communicates with User Devices 110*a* over Network 150. Interface 204 provides the client facing API and presentation pathway by which users initiate video calls, receive missed call notifications, access stored video messages, and configure their preferences (including creating and managing prerecorded outgoing messages). In operation, Interface 204 cooperates with a User Interface Engine 208 to render user controls and views, with a Network Routing Interface 202 to deliver streamed media at call time (e.g., the receiver's prerecorded message) and to capture any caller reply, and with a Video Voicemail Data Server Interface 206 to retrieve and persist messages and related metadata in a Video Voicemail Database 104. Interface 204 may obtain selected assets (e.g., via a Video Voicemail Data Server Interface 206) and stream it to the caller device. After playback, the caller device is prompted to record a video reply, leave an audio-only message, or decline to leave a message.

The User Device Interface 204 may be a server side interface that exchanges control and media with User Devices 110*a* over Network 150 (e.g., using HTTPS for UI/API requests and WebRTC for media), often in coordination with a Network Routing Interface 202. When a caller initiates a video call, Interface 204 receives the call setup request and conveys it to a Video Voicemail Server 102. If the call becomes unanswered under the receiver's wait time/status criteria, the server automatically applies the receiver's decision rules (e.g., via a Rules Engine 210), obtains the selected prerecorded asset through a Video Voicemail Data Server Interface 206, and streams that receiver-authored message to the caller device via Interface 204. Caller video (or, in some embodiments, audio-only) replies captured through Interface 204 are persisted for later retrieval and playback by the receiver on their user device.

In one embodiment, a Video Voicemail Data Server Interface 206 provides the programmatic data access layer for the system. Interface 206 exposes create/read/update/delete operations used by a Video Voicemail Server 102, a Rules Engine 210, and a User Interface Engine 208 to store and retrieve (i) receiver decision tree rules and preferences, (ii) call records and associated metadata, and (iii) identifiers/locations of media assets-receiver-authored prerecorded greetings and caller video (or, in some embodiments, audio-only) replies-persisted in a Video Voicemail Database 104 and, where applicable, an associated media/object store. Interface 206 may also enforce schema validation and transactional consistency and, in coordination with an Encryption/Data Security Engine 212, apply access controls when serving records. Interface 206 may expose create/read/update/delete operations invoked at call time by a Video Voicemail Server 102 and Rules Engine 210 to fetch the selected asset, and by a User Interface Engine 208 to manage user settings and access stored messages.

In operation, a Video Voicemail Data Server Interface 206 provides programmatic access (e.g., create/read/update/delete) to a Video Voicemail Database 104 for the modules that handle missed calls. When an incoming video call becomes unanswered under the receiver's status and wait time preferences, a Video Voicemail Server 102, for example, via a Rules Engine 210 queries Database 104 through Interface 206 to obtain the receiver's decision tree rules and the identifier/location of the selected receiver-authored prerecorded message. Server 102 then retrieves the selected asset via Interface 206 and streams it to the caller (e.g., over a Network Routing Interface 202 and User Device Interface

204). If the caller leaves a reply, Interface 206 is used to persist the caller's video (or, in some embodiments, audio-only) message in Database 104 together with associated metadata (e.g., sender identity, timestamps, duration, and storage location) for later retrieval by the receiver.

In one embodiment, a User Interface Engine 208 is a client-facing component that provides a centralized portal through which users manage preferences, configure decision tree call routing rules, and interact with stored video messages. The engine presents configuration and message center views to User Devices 110*a* via a User Device Interface 204 over Network 150, and persists or retrieves settings and message metadata through a Video Voicemail Data Server Interface 206 to a Video Voicemail Database 104. Preferences established through the User Interface Engine 208 are applied at call time by a Video Voicemail Server 102 to handle unanswered calls in accordance with the user's rules.

A User Interface Engine 208 may present configuration views (e.g., via a User Device Interface 204 over Network 150) through which a receiver defines and updates call handling preferences as a decision tree. The receiver may specify, by condition (e.g., caller identity or category, time of day or date, receiver status) and wait time threshold, whether an incoming video call is (i) delivered directly, (ii) forwarded to an alternate destination, or (iii) routed to the video voicemail flow when unanswered. The engine persists these preferences via a Video Voicemail Data Server Interface 206 to a Video Voicemail Database 104. At call time, a Video Voicemail Server 102 applies the stored rules using a Rules Engine 210 to enforce the selected handling automatically.

The User Interface Engine 208 may provide end user controls delivered to User Devices 110*a* via a User Device Interface 204 for creating, uploading, and managing receiver-authored prerecorded video messages tailored to different scenarios (e.g., business vs. personal). Through this interface, a receiver can associate each message with conditions in a decision tree and designate defaults. The engine persists the messages and their metadata (e.g., identifiers, descriptions, and selection rules) to a Video Voicemail Database 104 via a Video Voicemail Data Server Interface 206. At the time a call is not answered, a Video Voicemail Server 102 applies the receiver's decision tree (e.g., via a Rules Engine 210) to automatically select and stream the appropriate pre-recorded message to the caller.

The User Interface Engine 208 may present a message center (inbox) view to User Devices 110*a* (e.g., via a User Device Interface 204) through which an authorized receiver can review and manage video voicemails left by callers. The engine retrieves message listings and associated metadata-such as sender identity, receipt timestamp, duration, and storage location-via a Video Voicemail Data Server Interface 206 from a Video Voicemail Database 104, and streams selected media to the receiver for playback. Users may view, play, delete, or archive messages; these actions update the corresponding records (e.g., via Backend System 214) for later reporting. In some embodiments, AI-generated artifacts (e.g., a transcript and/or textual description) associated with each stored message are displayed alongside the media. The interface may further provide sorting, filtering, and search functions. Access to message content and metadata is governed by the system's authentication and authorization controls in coordination with an Encryption/Data Security Engine 212.

In various embodiments, the User Interface Engine 208 is implemented as a web application delivered to User Devices 110*a* over Network 150 via a User Device Interface 204 using HTTPS (HTTP over TLS). The interface renders configuration and message center views using HTML/CSS/JavaScript, and client side scripts issue asynchronous API requests to a Video Voicemail Server 102, which in turn accesses a Video Voicemail Database 104 through a Video Voicemail Data Server Interface 206 to persist or retrieve user preferences and message metadata. Where supported, the browser establishes media sessions (e.g., WebRTC) to stream receiver-authored prerecorded messages and to capture caller replies. This web-based approach enables access from desktop and laptop computers, tablets, and smartphones without limiting other implementation options.

In another embodiment, the User Interface Engine 208 may be realized as a native mobile application (e.g., for iOS or Android) executing on User Devices 110. The app communicates with a Video Voicemail Server 102 over Network 150 (e.g., via a User Device Interface 204 using HTTPS) to present configuration and message center views, while the server persists and retrieves preferences and message metadata through a Video Voicemail Data Server Interface 206 to a Video Voicemail Database 104. Using platform camera/microphone APIs, the app captures caller replies, and, where supported, establishes media sessions (e.g., WebRTC or native media transports) to stream receiver-authored prerecorded messages at call time and upload recorded replies. The native implementation may also integrate mobile push notifications to alert receivers of new video voicemails; preferences configured in the app are applied at non-answer by the server's Rules Engine 210.

In various embodiments, a User Interface Engine 208 communicates over Network 150 with backend components, e.g., APIs exposed by a Video Voicemail Server 102—to retrieve and update user data. Through a Video Voicemail Data Server Interface 206, these APIs perform create/read/update/delete operations against a Video Voicemail Database 104 for items such as receiver preferences and decision tree rules, message metadata (e.g., identifiers, timestamps, duration, storage locations), AIgenerated transcripts/descriptions, and identifiers/locations for prerecorded greetings and caller replies. Requests are conveyed using APIs or web services (e.g., over HTTPS/TLS) and may employ authentication and authorization coordinated with an Encryption/Data Security Engine 212. While configuration and message center data flow through these APIs, call-time media streaming to/from User Devices 110a is handled at runtime via a User Device Interface 204 (and, in some embodiments, a Network Routing Interface 202).

In various embodiments, a User Interface Engine 208 may deliver HTML/CSS/JavaScript views to User Devices 110 over User Device Interface 204 over Network 150, employing responsive layout techniques so that configuration pages, message center listings, and playback controls adapt to differing screen sizes and orientations. The interface includes accessibility features to support users with disabilities, such as structured keyboard navigation and screen reader-addressable control labels; where available, the UI may also surface caption rendering and sign-language inset presentation for stored prerecorded messages. User preferences related to layout and accessibility are persisted through a Video Voicemail Data Server Interface 206 to a Video Voicemail Database 104.

The User Interface Engine 208 may integrate with external services via APIs or web services exposed by a Video Voicemail Server 102, enabling, in some embodiments, user-initiated sharing of stored messages (e.g., by generating an access controlled, time limited link suitable for posting to third party platforms). Access to shared content is authenticated and authorized in coordination with an Encryption/Data Security Engine 212, while shared events and targets are recorded by a Backend System 214. Within the video voicemail system, the User Interface Engine 208 supports collaboration by allowing an authorized user to share a message with another authorized user for review; the recipient may view the media stream and associated metadata (and, where available, AI-generated transcripts/descriptions). In all cases, message records and permissions are retrieved and persisted via a Video Voicemail Data Server Interface 206 to a Video Voicemail Database 104, and media is streamed to User Devices 110a over Network 150 through a User Device Interface 204

The Rules Engine 210 enforces a receiver's preferences by evaluating a receiver-defined decision tree at call time when an incoming video call becomes unanswered under configured wait time and status criteria. The Rules Engine receives a normalized call context (e.g., caller identity or category, time of day or date, receiver availability, and ring/wait time count) from a Video Voicemail Server 102, consults the receiver's stored rules via a Video Voicemail Data Server Interface 206 to a Video Voicemail Database 104, and returns an action directive identifying (i) the receiver-authored prerecorded message to present (by asset identifier), and (ii) handling options such as whether to permit a caller reply, forward the call to an alternate destination, or suppress playback. The server then retrieves and streams the selected asset to the caller (e.g., via Network Routing Interface 202 and User Device Interface 204) and enables or disables the caller reply prompt accordingly (in some embodiments, allowing audio-only replies). For example, when the caller is categorized as an internal/enterprise contact and a configured wait time threshold has elapsed, the Rules Engine may select an "out-of-office" video with no reply option; for other callers, it may select an "onvacation" video and permit a video reply.

The Rules Engine may consult the receiver's decision tree, retrieved via a Video Voicemail Data Server Interface 206 from a Video Voicemail Database 104 and evaluate the specified conditions (e.g., whether the caller is an internal/enterprise contact) to produce an action directive identifying the receiver-authored prerecorded message to present and whether a caller reply is permitted (with optional directives such as forwarding or suppression in some embodiments). Server 102 then retrieves and streams the selected asset to the caller (e.g., via a Network Routing Interface 202 and User Device Interface 204) and enables or disables the caller reply prompt accordingly.

In various embodiments, the Rules Engine 210 may be configured with differing levels of sophistication while preserving its primary function of enforcing call handling preferences when a call becomes unanswered. In a minimal configuration, the engine does not differentiate among callers; once a configured wait time threshold (e.g., measured by elapsed seconds or ring count) is reached, it returns an action directive to present a single receiver-authored prerecorded message and, in some implementations, to suppress any caller reply option. In a policy-prioritized configuration, enterprise-level rules take precedence over user rules—for example, a blocklisted caller may trigger selection of a specified message or immediate termination—after which user-level conditions are applied. In an ML-assisted configuration, the engine consults a machine learning model that, based on historical interactions and outcomes, recommends or automatically adjusts selection thresholds or ranking among candidate prerecorded messages; any adaptations are persisted (subject to policy) via a Video Voicemail Data Server Interface 206 to a Video Voicemail Database 104 and may be logged by a Backend System 214. In all cases, a Video Voicemail Server 102 invokes the Rules Engine at call time, obtains the action directive (e.g., asset identifier and whether a caller reply is permitted), retrieves and streams any selected message to the caller (e.g., via Network Routing Interface 202 and User Device Interface 204), and records the resulting disposition.

The Encryption/Data Security Engine 212 is provided to help ensure the privacy, confidentiality, and integrity of data handled by the video voicemail system. In coordination with a Video Voicemail Server 102, the engine protects information exchanged with User Devices 110*a* over Network 150 via a User Device Interface 204 and/or Network Routing Interface 202 (intransit protection), and information persisted through a Video Voicemail Data Server Interface 206 to a Video Voicemail Database 104 (at rest protection). Protected data may include receiver preferences and decision tree rules, receiver-authored prerecorded messages, caller video (or audio-only) replies, associated metadata (e.g., identifiers, timestamps, and storage locations), and any AI-generated transcripts or descriptions. The engine may further enforce authentication and authorization controls so that only authorized components and users can access or modify such data.

In one embodiment, the Encryption/Data Security Engine 212 provides cryptographic services for both data in transit and at rest to help ensure privacy and integrity. In coordination with a Video Voicemail Server 102, the engine applies transport level protection when communicating with User Devices 110*a* over Network 150 (e.g., via a User Device Interface 204 and/or Network Routing Interface 202) and encrypts payloads persisted through a Video Voicemail Data Server Interface 206 to a Video Voicemail Database 104 and any associated media/object storage. Bulk content (e.g., receiver preferences and decision tree rules, receiver-authored prerecorded messages, caller replies, message metadata, and AI-generated artifacts) may be encrypted using symmetric ciphers (e.g., AES), while asymmetric cryptography (e.g., RSA) may be used for key establishment or envelope encryption and, in some embodiments, digital signatures. Authenticated encryption and integrity checks may be applied so that intercepted traffic or out of band access does not reveal readable plaintext. The Encryption/Data Security Engine 212 decrypts the payload using appropriate keys, so the data is available for further processing. Conversely, before persistence, the engine 212 encrypts data that is written via a Video Voicemail Data Server Interface 206 to a Video Voicemail Database 104 (and any associated media/object storage). These operations help ensure confidentiality of data in transit and at rest and that readable plaintext is exposed only to authorized system components in accordance with access controls enforced by Engine 212

In one embodiment, an Encryption/Data Security Engine 212 enforces access control and data ownership policies on interfaces exposed by a Video Voicemail Server 102—for example but not limited to, interactive access via a User Device Interface 204 and programmatic access via a Video Voicemail Data Server Interface 206 to a Video Voicemail Database 104. The engine authenticates principals and authorizes operations so that only the account owner (or an authorized role/delegate) may access or modify protected resources such as receiver preferences and decision tree rules, receiver-authored prerecorded messages, caller replies, and associated metadata. Authentication and authorization may employ user sign-in mechanisms together with token-based access control and/or role-based access control (RBAC) to help ensure that only authorized parties can act on the corresponding records.

To help ensure security in transit, an Encryption/Data Security Engine 212 configures use of transport layer protections appropriate to each path for example, HTTPS/TLS for web UI and API traffic delivered to User Devices 110*a* via a User Device Interface 204, SIP over TLS for call signaling exchanges, and DTLS-SRTP (or SRTP) for negotiated media streams handled by a Network Routing Interface 202. These protocols provide authenticated, encrypted channels between a Video Voicemail Server 102 and User Devices 110*a* over Network 150, helping to protect both signaling and media against eavesdropping or tampering during transit.

The Encryption/Data Security Engine 212 may be implemented consistent with the video voicemail system's security requirements and technology stack, as either a software library linked into server components or a service exposing programmatic APIs. Implementations may be authored in Java, Python, C++, or comparable languages and leverage well-established cryptographic libraries and frameworks. The engine's APIs are invoked by a Video Voicemail Server 102 and cooperating interfaces (e.g., User Device Interface 204, Network Routing Interface 202, Video Voicemail Data Server Interface 206) to establish transport security, encrypt/ decrypt data persisted to a Video Voicemail Database 104 (and associated media/object storage), perform key generation/wrapping, and apply signature/verification as required, without limiting the disclosed functionality to any particular stack or deployment model.

In some embodiments, an Encryption/Data Security Engine 212 integrates with third party security services to provide cryptographic functions. By way of example, cloud security platforms, hardware security modules (HSMs), or encryption as a service offerings may expose APIs that Engine 212 invokes to perform key generation and protected key storage (e.g., via an HSM/KMS), envelope encryption/ wrapping for data persisted through a Video Voicemail Data Server Interface 206 to a Video Voicemail Database 104, and certificate issuance/rotation and TLS session establishment for traffic handled via a User Device Interface 204 and/or Network Routing Interface 202. These integrations may be used to protect receiver-authored prerecorded messages, caller video (or audio-only) replies, decision tree rules, and associated metadata, without altering the functional behavior of the Video Voicemail Server 102 or limiting the disclosed architecture.

To help ensure security, an Encryption/Data Security Engine 212 may implement additional controls including secure key management (e.g., key generation, rotation, revocation, wrapping, and protected storage), periodic security assessments (e.g., vulnerability scanning and code review), and adherence to industry standard practices such as OWASP guidelines. Engine 212 may further provide monitoring and audit logging of security relevant events across system interfaces (e.g., User Device Interface 204, Network Routing Interface 202, Video Voicemail Data Server Interface 206) and protected stores (e.g., Video Voicemail Database 104), and may emit alerts when anomalous or unauthorized activity is detected so that operators can respond. In some embodiments, security logs and alerts are persisted and reported via a Backend System 214.

In some embodiments, an Encryption/Data Security Engine 212 is configured to support compliance with applicable privacy and data protection requirements (e.g., GDPR, HIPAA) based on the deployment jurisdiction and the nature of the data handled. In coordination with a Video Voicemail Server 102, User Device Interface 204, Video Voicemail Data Server Interface 206, and Video Voicemail Database 104, the engine may provide: authentication/authorization and least privilege access controls; encryption in transit and at rest for receiver preferences and decision tree rules, receiver-authored pre recorded messages, caller replies, and associated metadata; configurable retention and deletion policies; mechanisms to locate, export, rectify, or delete user records; audit logging via a Backend System 214; and optional data residency constraints and breach notification hooks. These features are illustrative and may be tailored to jurisdiction specific obligations without limiting the disclosed architecture.

The Backend System 214 manages metadata and accounting records associated with video voicemail activity. The subsystem ingests call and message events emitted by a Video Voicemail Server 102, computes and tracks operational metrics (e.g., start and end timestamps, call duration and frequency, caller and receiver identifiers, message disposition), and associates any applicable costs or billing attributes. Backend System 214 persists these records via a Video Voicemail Data Server Interface 206 to a Video Voicemail Database 104, and provides programmatic and/or administrative interfaces for operational reporting/analytics and accounting (e.g., summaries, statements, or invoices).

The Backend System 214 collects metadata for each video call processed by the system by ingesting call and message events emitted by a Video Voicemail Server 102. Captured fields may include start and end timestamps (for duration), caller and receiver identifiers, and call dispositions (e.g., whether a video voicemail was left), and, in some embodiments, identifiers or locations of associated media. Backend System 214 organizes and persists these records via a Video Voicemail Data Server Interface 206, in a Video Voicemail Database 104, where they are indexed to support programmatic retrieval and reporting/analytics.

For operational reporting, the Backend System 214 aggregates call, and message metadata emitted by a Video Voicemail Server 102 and persisted via a Video Voicemail Data Server Interface 206 to a Video Voicemail Database 104. The system 214 may compute usage metrics, e.g., peak calling times (by time window), average/median call duration, message play counts, caller reply rates, and activity summaries by account or group and exposes these results through programmatic and/or administrative reporting interfaces (with access governed by an Encryption/Data Security Engine 212). In some embodiments, Backend System 214 evaluates configurable thresholds to identify accounts with delayed response to received video voicemails and triggers escalation actions, such as generating reminders or administrative alerts presented via a User Interface Engine 208; corresponding events may be logged for audit. These aggregated data and alerts support capacity planning and resource allocation without limiting the disclosed architecture In one embodiment, the Backend System 214 derives billing records from call and message metadata emitted by the Video Voicemail Server 102, for example, call duration, the number of messages left, and any premium feature usage configured for the service. Backend System 214 applies configurable billing rules to compute charges, assembles invoice line items by account, and persists the resulting statements and summaries via a Video Voicemail Data Server Interface 206 to a Video Voicemail Database 104. Invoices and reports for individual users or organizations may be rendered to administrators through a User Interface Engine 208 and, in some embodiments, exported to third party financial software. Access to billing data and reports is governed by an Encryption/Data Security Engine 212.

In some embodiments, the system 214 generates structured records from caller replies for integration with enterprise systems. In various embodiments, the Backend System 214 may be deployed as separate reporting/analytics and accounting/billing services rather than a single integrated subsystem. In other embodiments, Backend System 214 may utilize cloud-based storage and analysis services to improve scalability and reduce local processing needs, and may integrate with third party financial software to generate invoices and advanced billing reports. Regardless of deployment, Backend System 214 ingests call and message events from a Video Voicemail Server 102, computes and tracks operational and billing metrics, and persists the resulting records via a Video Voicemail Data Server Interface 206 to a Video Voicemail Database 104. Administrators may retrieve summaries and statements through a User Interface Engine 208, with access governed by an Encryption/Data Security Engine 212. The subsystem's primary function remains to track, store, and analyze metadata around video calls for both operational and financial management purposes.

Computer Implemented Process

Figure 3A:
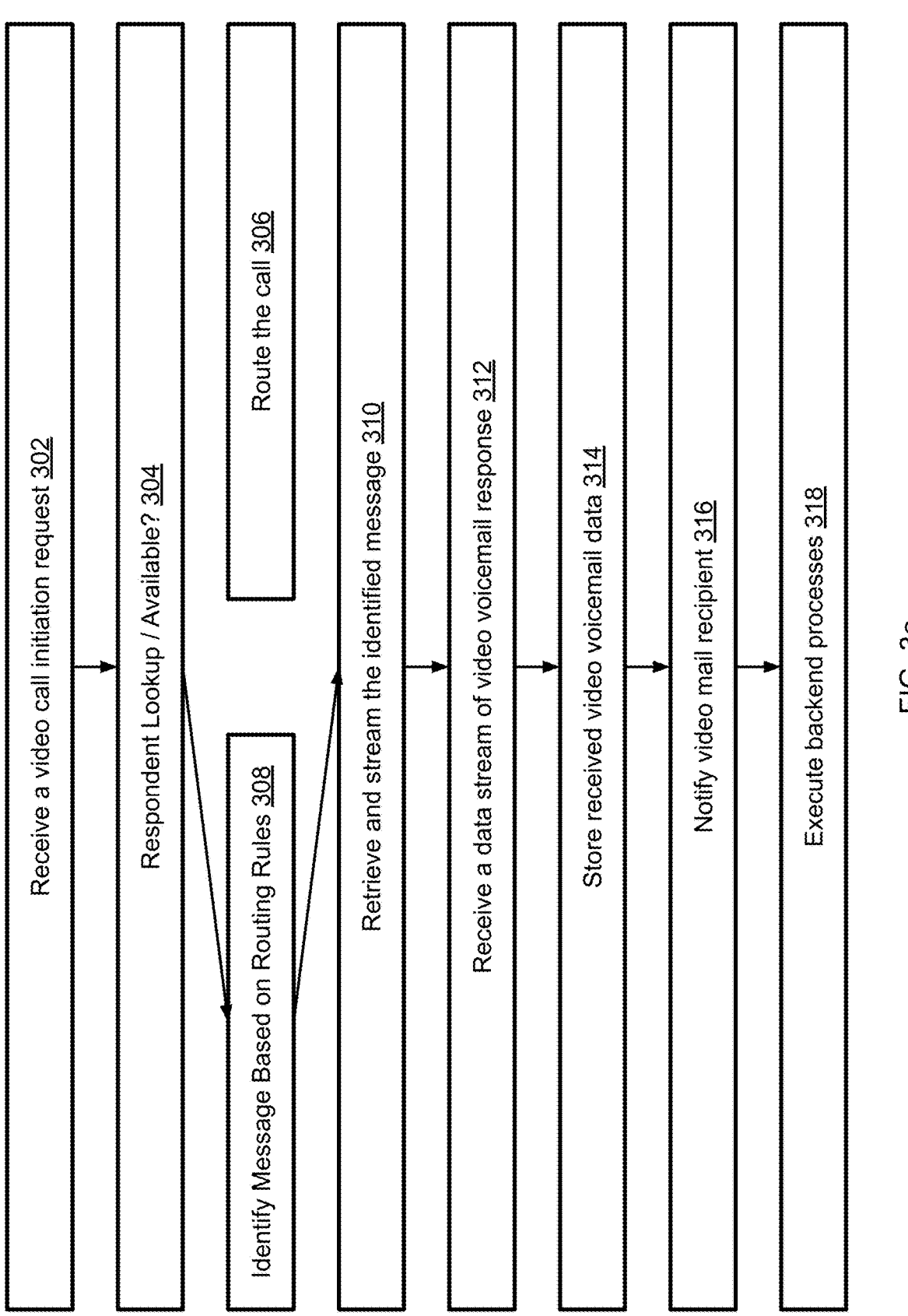
FIG. 3*a* illustrates an exemplary computer implementation of the process for showing a video caller a video response if the receiver is not available, and the ability for the caller to leave a video message. according to one embodiment of the invention.

FIG. 3*a* is a diagram showing the possible outcomes of a person making a video call. The outcomes include unattended video response, and the ability to leave a video message. The process steps described herein may be performed in association with a system such as that described in FIG. 1 and/or FIG. 2 above or in association with a different system. The process may comprise additional steps, fewer steps, and/or a different order of steps without departing from the scope of the invention as would be apparent to one of ordinary skill in the art.

Advantages of Same-Session Reuse. In SIP embodiments, the server streams the prerecorded asset as early media (310) or on an answered leg and subsequently re-invites or updates within the same dialog to capture the reply; in WebRTC embodiments, the server injects a prerecorded track and then uses replaceTrack/add Transceiver on the same RTC Peer Connection without a new ICE/DTLS handshake. Maintaining the original session reduces signaling overhead, minimizes setup latency, limits failure modes introduced by re-dialing, and improves caller continuity relative to approaches that tear down and recreate sessions.

In one embodiment, at step 302, a video-calling Platform receives the incoming video call setup message, extracts the receiver's identifier (e.g., a "video identifier") together with caller identity and other signaling metadata, and normalizes these elements into a call context. The server then forwards this call context to its call handling logic for subsequent availability/wait time evaluation and decision tree processing Upon diversion of the incoming call to the video voicemail flow, a Video Voicemail Server via a Network Routing Interface answers the call leg on behalf of the receiver. Using the forwarded receiver identifier (e.g., a "video identifier"), the server resolves the corresponding user account and retrieves the user's receiver-defined decision tree and associated preferences from a Video Voicemail Database through a Video Voicemail Data Server Interface. The decision tree encodes the receiver's rules for handling unanswered video calls (e.g., by caller identity/category, time/date, and wait time thresholds) and is subsequently evaluated, to determine the next action.

At step 302 ("Receive video call initiation request"), handlers executing on a Video-calling Platform or can be passed off to the Video Voicemail Server to accept incoming call signaling, e.g., via a Network Routing Interface or User Device Interface over a Network, extract caller and receiver identifiers (e.g., a receiver "video identifier"), timestamps, and channel metadata, and normalize these into a call context for subsequent availability and decision tree evaluation. Step 302 may be implemented in Java, Python, Node.js, or comparable environments using appropriate signaling and media libraries (e.g., for SIP/WebRTC) and database clients or ORMs to access a Video Voicemail Database through a Video Voicemail Data Server Interface. The cited languages and frameworks are illustrative and non-limiting with respect to the disclosed functionality.

In some embodiments step, a Video Voicemail Server issues a keyed read via a Video Voicemail Data Server Interface using the forwarded receiver identifier (e.g., "video identifier") and Interface employs the appropriate NoSQL SDK or API to retrieve the serialized receiver-defined decision tree and related preferences. The retrieved data is then supplied for evaluation (e.g., by a Rules Engine 210) during call-time handling. The specific NoSQL product is illustrative and non-limiting.

At step 302, a Video Voicemail Server may issue a keyed read via a Video Voicemail Data Server Interface using the receiver identifier (e.g., the forwarded "video identifier"). The Interface first attempts a cache look up for the serialized receiver-defined decision tree; on a cache hit, the tree is returned immediately, while on a cache miss the Interface retrieves the record from a Database, returns it to the Server, and populates the cache (e.g., with a time-to-live or version tag). When the receiver updates preferences through a User Interface Engine, the corresponding cache entry may be invalidated or refreshed. Regardless of caching, the retrieved decision tree is then evaluated during call handling Step 304 ("Respondent Lookup/Available") is performed by a Video Voicemail Server in coordination with a Network Routing Interface and User Device Interface over Network to determine the receiver's availability when a video call is initiated. Using the receiver's status and a configured wait time threshold, the server monitors whether the receiver answers. If the receiver is available and answers within the threshold, the call is routed to the receiver's User Device 110a (see step 306). If the call becomes unanswered under the receiver's status and wait time criteria, control transfers to the video voicemail handling flow for decision tree evaluation and subsequent action (see step 308).

During step 304 ("Respondent Lookup/Available"), a Video Voicemail Server in coordination with a Network Routing Interface and a User Device Interface transmits call setup/availability signaling over Network (e.g., SIP or WebRTC) to the receiver's User Device. If the receiver answers within the configured wait time threshold, the server completes call setup and connects the parties. If the device does not respond within the threshold, declines, or reports unavailability, the call is deemed unanswered and control transfers to the video voicemail handling flow (step 308), wherein a Rules Engine evaluates the receiver's decision tree, the identified receiver-authored prerecorded message is obtained via a Video Voicemail Data Server Interface from a Video Voicemail Database, and the selected media is streamed to the caller via Interfaces.

In some embodiments, the receiver-defined decision tree may be adapted in real time based on observed outcomes or analytics feedback. For example, the Rules Engine or Backend System may record metrics such as message play counts, caller reply rates, or escalation events, and automatically adjust decision-tree parameters or greeting variants to improve engagement. Adaptations may include re-ranking candidate prerecorded assets, updating wait-time thresholds, or dynamically creating new branches for identified caller categories. This enables the system to continuously optimize handling behavior while preserving session continuity and auditability of the applied rules.

In various embodiments, step 304 ("Respondent Lookup/Available") performed by a Video Voicemail Server may determine receiver availability using mechanisms other than (or in addition to) an active request/response exchange. For example, the server may consult a published presence/state (e.g., available, busy, do-not-disturb) from the receiver's User Device or an associated service, or apply configured time-of-day/day-of-week schedules or enterprise policies that designate the receiver as unavailable during specified hours. When such signals or policies indicate unavailability, the server may bypass device paging and transfer control directly to the video voicemail handling flow (step 308). Otherwise, the server proceeds with call setup signaling via a Network Routing Interface and/or User Device Interface; if the receiver does not answer within the configured wait time threshold, the call is deemed unanswered and the system advances to step 308. These alternatives do not alter the primary function of step 304 to determine, at call time, whether to complete the call to the receiver (step 306) or invoke the video voicemail flow (step 308).

In one embodiment, step 306 ("Route the call, Yes Respondent Available") is performed by a Video Voicemail Server when the receiver answers within the configured wait time determined at step 304. The server, in coordination with a Network Routing Interface and a User Device Interface, completes call setup signaling and negotiates the media session over Network 150, thereby establishing a real-time video connection between the caller's and receiver's User Devices. In some embodiments, transport layer protections are applied in coordination with an Encryption/Data Security Engine, and call connection events and associated metadata are recorded by a Backend System.

In some embodiments, the caller's reply may include more than a video or audio message. For example, the system may support structured data entries, form-based responses, screenshots, image or document uploads, or visual annotations such as augmented reality (AR) markups or three-dimensional media assets. These reply formats may be submitted during the same call session or linked through a secure upload token. The Video Voicemail Server captures such inputs via the same device interface pathways used for media, and persists them in the Video Voicemail Database with associated metadata so that all reply artifacts remain contextually linked to the original unanswered call. This flexibility enables the system to accommodate evolving communication modalities while preserving session continuity and metadata integrity for downstream processing.

In one embodiment, upon receipt of a positive answer from the receiver within the configured wait time at step 304, the system performs step 306 ("Route the call, Yes Respondent Available"). A Video Voicemail Server, in coordination with a Network Routing Interface and a User Device Interface, completes call setup signaling and negotiates the media session over Network, thereby establishing a real-time video connection between the caller's and receiver's User Devices. In some embodiments, transport layer protections (e.g., HTTPS/TLS for control paths and DTLS-SRTP for media) are applied in coordination with an Encryption/Data Security Engine. Connection events and associated metadata (e.g., start time, parties, negotiated modalities) may be recorded by a Backend System. In WebRTC embodiments, immersive replies, such as three-dimensional (3D) video, augmented reality (AR) content, or virtual reality (VR) assets may be captured using either (i) WebRTC data channels for file-based or structured payloads, or (ii) RTP media streams configured with application-specific MIME types (e.g., model/gltf+json, application/x-ar-scene, or similar). These formats may include time-aligned metadata or spatial overlays that enable rendering by compatible devices and clients. The system stores immersive reply content in the video voicemail database along with associated metadata including sender identity, time-stamps, and storage location. In SIP environments, immersive reply support may be limited to static media (e.g., still images or audio-only responses) due to protocol constraints, with fallback behavior applied accordingly.

In various embodiments, step 306 ("Route the call, Yes Respondent Available") may be realized using alternative connection patterns while preserving its core function of connecting the call when the receiver is available. In a direct bridge configuration, once availability is established at step 304, a Video Voicemail Server in coordination with a Network Routing Interface and a User Device Interface completes call setup signaling and negotiates the media session over Network, bridging the caller to the receiver without an additional positive response roundtrip to the receiver device. In a callback configuration, the server issues a notification to the receiver; upon the receiver's callback acceptance, the server establishes the signaling and media session and bridges the parties. In either case, transport layer protections may be applied in coordination with an Encryption/Data Security Engine, and connection events/metadata may be recorded by a Backend System. These alternatives do not alter the sequencing relative to step 304 and merely provide different mechanisms to complete step 306.

In one embodiment, step 308 ("Identify Message Based on Routing Rules" "No Respondent Not Available") is invoked when an incoming video call becomes unanswered under the receiver's configured wait time and status criteria determined at step 304. A Video Voicemail Server (e.g., via a Rules Engine) evaluates the receiver-defined decision tree using a normalized call context (such as caller identity or category, time of day/date, and other configured conditions). The engine retrieves the receiver's rules and preferences via a Video Voicemail Data Server Interface from a Video Voicemail Database and returns an action directive identifying the receiver-authored prerecorded message to present and whether to permit a caller reply, or directing alternate handling (e.g., forwarding, sending a text/SMS, or termination). The selected action is then executed in subsequent steps (e.g., step 310 for retrieval and streaming).

Then an attempted video call remains unanswered beyond the receiver configured wait time (e.g., a specified ring count or elapsed time) determined at step 304, the system invokes step 308 and automatically evaluates the receiver-defined decision tree. A Video Voicemail Server 102 (e.g., via a Rules Engine 210) applies the tree to a normalized call context such as time of day/date, caller identity or category, and other configured conditions retrieved as needed via a Video Voicemail Data Server Interface 206 from a Video Voicemail Database 104. The evaluation yields an action directive that may specify, by way of example, playing a receiver-authored prerecorded video, sending a text/SMS to the caller, and/or prompting the caller to leave a video voicemail. The selected action is executed in subsequent steps (e.g., step 310 for retrieval and streaming).

In step 308 ("Identify Message Based on Routing Rules"), a Video Voicemail Server via a Rules Engine compares a normalized call context (e.g., caller identity or category, time of day/date, and receiver status) with the receiver's stored preferences encoded in a receiver-defined decision tree. The rules are obtained via a Video Voicemail Data Server Interface from a Video Voicemail Database. The Rules Engine evaluates these conditions at call time and returns an action directive (e.g., identify the receiver-authored prerecorded message to present and whether to permit a caller reply). By way of example, if the receiver's preferences specify that calls from a particular caller after business hours receive a designated message, the engine will select that message when the call occurs during those hours; the selected action is then executed in subsequent steps (e.g., step 310 for retrieval and streaming).

In various embodiments, step 308 ("Identify Message Based on Routing Rules") may be configured with differing complexity while preserving its purpose of presenting a caller response aligned to the receiver's preferences when a call becomes unanswered under the configured wait time. In a minimal configuration, a Rules Engine executing on a Video Voicemail Server evaluates a receiver-defined decision tree that, for example, distinguishes business hours from after-hours calls and selects a single receiver-authored prerecorded message accordingly. In a more advanced, ML-assisted configuration, the Rules Engine consults a model that uses historical interactions to predict receiver availability or response efficacy and may recommend or automatically adjust thresholds (e.g., wait time) or ranking among candidate prerecorded messages; any updates are persisted via a Video Voicemail Data Server Interface to a Video Voicemail Database and may be surfaced for user review. In all cases, the evaluation yields an action directive (e.g., which prerecorded message to play, whether to permit a caller reply, or alternate handling such as forwarding or sending a text/SMS) that is executed in subsequent steps of the flow.

In step 310 ("Retrieve and stream the identified message"), a Video Voicemail Server obtains, from the action directive produced in step 308, the identifier of the receiver-authored prerecorded message selected for the caller. The server then locates and retrieves the designated asset via a Video Voicemail Data Server Interface from a Video Voicemail Database and/or associated media/object storage, and initiates streaming to the caller's User Device 110a through a Network Routing Interface (and, where applicable, a User Device Interface) over Network. During streaming, an Encryption/Data Security Engine may apply transport protections (e.g., HTTPS/TLS for control paths; DTLS-SRTP for media), and the system may perform transcoding or format/bitrate adaptation for playback compatibility across device types. In alternative embodiments, the prerecorded asset may reside on recipient device local storage, cloud object storage, or distributed storage; likewise, streaming may employ different signaling/media protocols (e.g., SIP or WebRTC) without limiting the disclosed architecture. In SIP embodiments, streaming may occur via 183 early media within the same dialog; in WebRTC embodiments, the server may inject a prerecorded track on the same RTCPeerConnection.

In step 312 ("Receive a data stream of video voicemail response"), a Video Voicemail Server establishes a capture channel to the caller's User Device for example via a User Device Interface and, in some embodiments, a Network Routing Interface over Network after the receiver-authored prerecorded message has been streamed in step 310. The server receives the caller's reply stream, buffers incoming packets, and assembles any segmented data into a contiguous recording; where needed, it may apply compression or transcoding to normalize the file format and bitrate for downstream playback. Before persistence, an Encryption/Data Security Engine may encrypt the payload. The server then writes the resulting media and associated metadata (e.g., sender identity, recipient identifier, time of receipt, duration, and storage location/identifier) via a Video Voicemail Data Server Interface to a Video Voicemail Database and any associated media/object storage. In some embodiments, the reply may be audio-only, a multimedia clip with supplemental text, or delivered as segmented packets that are reassembled by the system; storage backends may include local server storage, distributed object storage, or cloud-based infrastructure, without limiting the architecture. Operational events and metrics for the transaction may also be recorded by a Backend System. The reply is captured in-session (SIP: in-dialog UPDATE or re-INVITE; WebRTC: addTransceiver and/or replaceTrack on the same RTCPeerConnection), without establishing a new session.

In step 314 ("Store received video voicemail data"), a Video Voicemail Server persists the caller's recorded reply, captured in step 312 together with associated metadata for later access by the receiver. The server writes the media to an associated storage backend (e.g., local server storage, network-attached storage, cloud-based object storage, or a distributed store) and commits the metadata, such as a unique message identifier, receiver account identifier, sender address, time of receipt, duration, storage location/URI, and content attributes via a Video Voicemail Data Server Interface to a Video Voicemail Database. The record is indexed under the receiver's account profile and associated with corresponding call records maintained by a Backend System. During persistence, an Encryption/Data Security Engine may apply encryption at rest and enforce access control permissions. In some embodiments, redundant copies of the media and/or metadata are maintained across multiple storage locations to improve fault tolerance and availability.

In step 316 ("Notify video voicemail recipient"), a Video Voicemail Server generates a notification payload to inform the receiver that a new video voicemail recorded at step 312 and stored at step 314 is available. The server obtains message metadata such as sender address, receipt timestamp, duration, a unique message identifier, and any AI-generated transcript or description via a Video Voicemail Data Server Interface from a Video Voicemail Database 104. The notification is then delivered over Network to the receiver's User Device 110a using a channel appropriate to the device type (e.g., a push notification for a native mobile app, a web portal update presented by a User Interface Engine, or an electronic message via the receiver's messaging client) through a User Device Interface. In some embodiments, the payload includes a secure, access-controlled link (optionally time-limited) to the stored message; authentication and authorization are enforced by an Encryption/Data Security Engine. The system may transmit notifications over multiple channels for redundancy, update "new message" indicators in the UI, and record delivery attempts and outcomes in a Backend System. Notification preferences (e.g., real-time alerts, scheduled summaries, or integrations with external messaging platforms) are configurable and persisted via Interface.

In step 318 ("Execute backend processes"), a Backend System records and manages operational data for the completed video voicemail transaction. The subsystem ingests events and metadata emitted by a Video Voicemail Server for example, call initiation and termination timestamps (for duration), caller and receiver identifiers, the unique message identifier and storage location/URI of any recorded reply, and message length and persists these details via a Video Voicemail Data Server Interface to a Video Voicemail Database. Backend System updates usage logs, maintains system statistics, and generates operational reports (e.g., peak calling times and activity summaries); where configured, it also derives billing records under applicable rules. Records are organized into structured entries, indexed to the receiver's account, and associated with the corresponding call/message records to support later retrieval and analysis. In some embodiments, Backend System integrates with third party financial or customer support software and performs analytics on call frequency and message patterns. To support reliability, security, and compliance objectives, the subsystem may apply redundancy, encryption, and audit logging in coordination with an Encryption/Data Security Engine In reference to FIG. 3b, a SIP Embodiment of the invention is presented. A Network Routing Interface terminates SIP signaling on Network for a call targeting a receiver. When Video Voicemail Server determines the call is unanswered (e.g., based on presence/schedule and elapsed rings or seconds), the server evaluates a receiver-defined decision tree via Rules Engine, retrieving the applicable rules from Video Voicemail Database 104 through Data Server Interface. The selected prerecorded asset is then streamed during the same SIP dialog by sending a 183 Session Progress with SDP (early-media variant) and delivering the prerecorded video over the negotiated SRTP path. In an answered-leg variant, the server may send 200 OK/ACK and stream on the answered leg. After playback, the server performs an in-dialog UPDATE or re-INVITE to switch media direction and capture the caller's reply on the same SIP dialog. The reply and associated metadata are stored in a Database. A backend System updates usage and billing records and triggers receiver notification. Encryption/Data Security Engine applies transport and at-rest protections In reference to FIG. 3c a WebRTC Embodiment is presented. In this embodiment, a caller endpoint establishes a single RTCPeerConnection with Video Voicemail Server 102 using an offer/answer exchange, ICE candidate exchange 305a, and DTLS handshake 305b resulting in SRTP media security. Upon non-answer, the server evaluates the receiver's decision tree to select a prerecorded asset and injects the asset as a remote media track on the same PeerConnection. Playback is delivered within the same PeerConnection instance, without creating a new PeerConnection. Immediately following playback, the caller is prompted to reply within the same session. The caller device acquires media (e.g., via getUserMedia), and the endpoints perform an in-session offer/answer while maintaining the existing DTLS/ICE state (e.g., through addTransceiver or replaceTrack). The caller's reply is streamed over the same PeerConnection, then persisted with metadata in Database 104. The receiver is notified, and no new ICE or DTLS handshake is required between playback and capture.

Figure 3B:
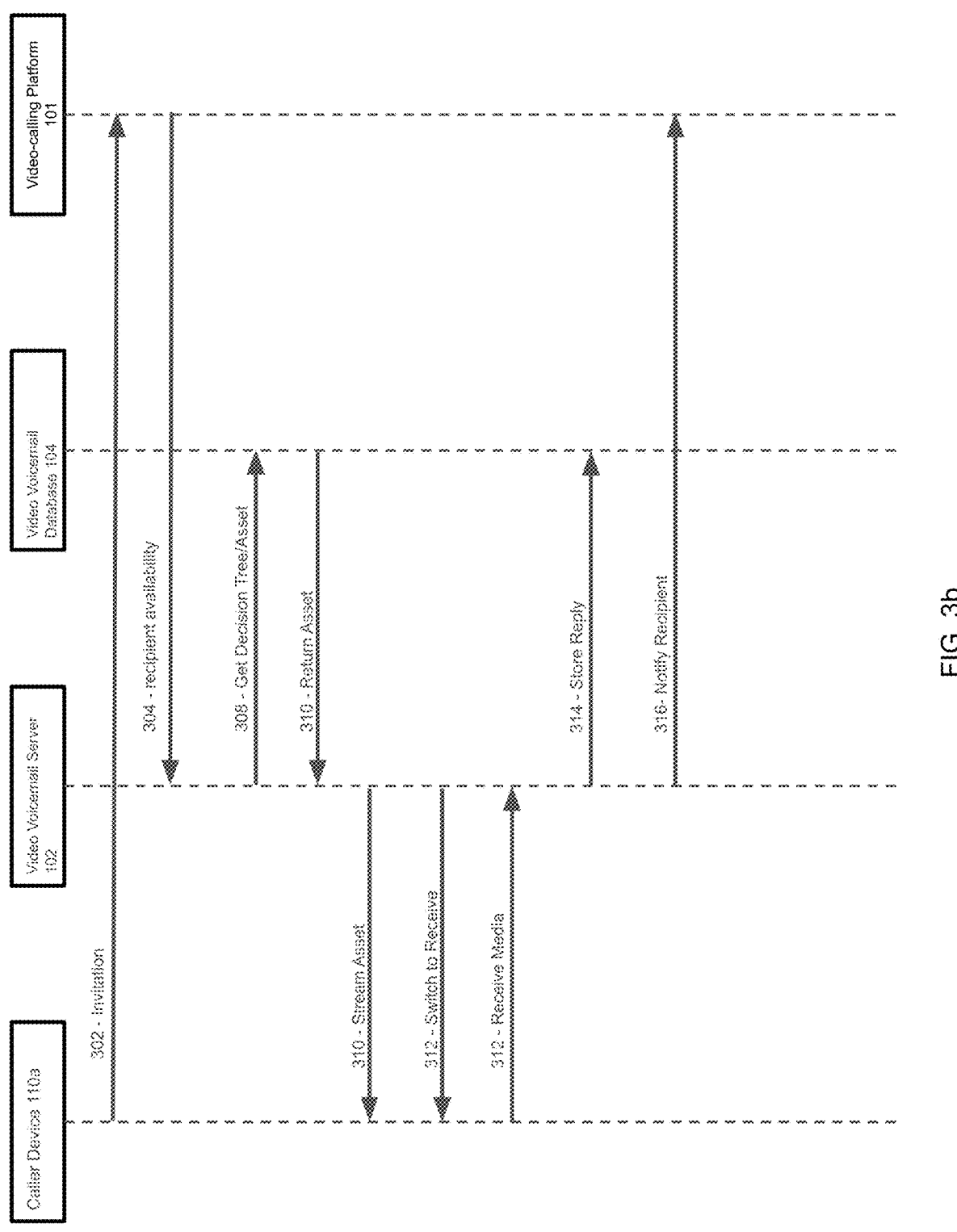
FIG. 3*b* illustrates a SIP implementation of the process that, upon determining a video call is unanswered, streams a prerecorded receiver-authored video as early media in the same SIP dialog and thereafter performs an in-dialog UPDATE or re-INVITE to switch media direction for capturing a caller reply according to one embodiment of the invention.
Figure 3C:
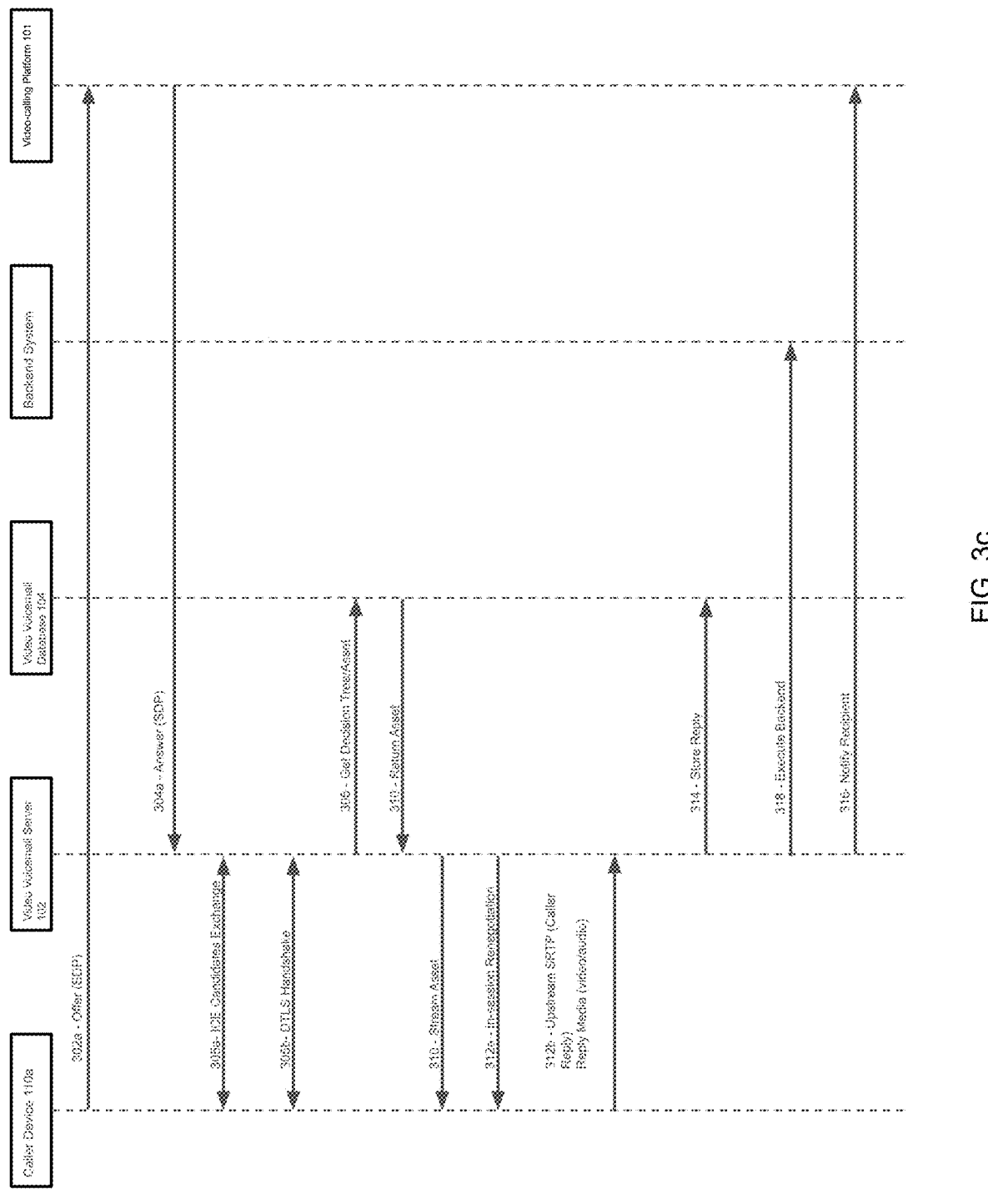
FIG. 3*c* illustrates an exemplary structured contact record export of the process for generating a structured contact record that is transmitted as an API or webhook payload to an external system such as a customer relationship management or helpdesk platform according to one embodiment of the invention.

Additionally in FIG. 3c Decision-Tree Integration and Handling Options are presented. A Rules Engine evaluates a receiver-defined decision tree keyed to a receiver identifier (e.g., a video identifier) to select handling at non-answer. Conditions may include caller identity or category, time or date, and wait-time thresholds. Actions may include (i) playing a designated receiver-authored prerecorded video, (ii) playing an audio-only message, or (iii) suppressing playback entirely. The directive may also specify whether a caller reply is permitted (video or audio-only), and may indicate forwarding or termination policies under enterprise controls. Selected assets and associated metadata (e.g., identifiers, timestamps, durations, storage locations) are retrieved and persisted through Interface to Database.

During playback, the server may adapt codec or bitrate in-session to endpoint capabilities or measured network conditions without tearing down the session. In some embodiments, prerecorded assets include accessibility features such as closed captions (optionally AI-generated) or a sign-language interpretation inset. These attributes are preserved during same-session streaming. Where bandwidth or device capability is limited, the system may downgrade the reply to audio-only while maintaining the same session for continuity. An Encryption/Data Security Engine applies HTTPS/TLS to control paths and DTLS-SRTP to media paths, and may enforce authentication and authorization for reply capture (e.g., token-gating the transition from playback to capture). Keys may be managed via a hardware security module (HSM) or a managed key service. Backend System records audit and usage events (e.g., start and end times, caller and receiver identifiers, disposition, asset identifiers) and, where configured, derives billing records and administrative reports.

In some embodiments, the SIP implementation admits a 200 OK answered-leg variant in which the prerecorded video is streamed on the answered leg prior to reply capture, while still retaining a single SIP dialog across both phases. Throughout, the Call-ID and tag values remain unchanged, indicating no new dialog is created between playback and capture.

In some embodiments, the WebRTC implementation admits variations in transceiver directionality or track-replacement mechanics. In each case, no new PeerConnection is created between playback and capture. The same-session constraint is met so long as playback and reply capture occur over the original negotiated PeerConnection instance.

The protocol-level operation described with reference to FIGS. 3*b* and 3*c* demonstrates that the prerecorded receiver message and the caller reply are both handled within a single call session. This approach avoids tearing down and creating new sessions, reduces signaling overhead, lowers latency, and provides seamless interaction for the caller. The embodiments further illustrate how the invention can be applied in different signaling environments while adhering to the same-session reuse constraint that defines the technical improvement.

As shown in FIG. 3*c*, a caller device provides a video reply to a Video Voicemail Server 102. The server persists the reply and associated metadata in a Video Voicemail Database, where the metadata may include sender identifier, receiver identifier, receipt timestamp, decision-rule identifier, and a computed score. The Backend System generates a structured contact record incorporating the reply reference and metadata fields. In certain embodiments, the Backend System transmits the structured record as an authenticated API or webhook payload to an external system such as a customer relationship management (CRM) or helpdesk application. This integration enables downstream workflows without departing from the core same-session voicemail architecture.

In step 312*a*., In-session Renegotiation, sends the signal to a Caller device that a server is ready to receive the caller Reply. The step Upstream SRTP (Caller Reply) Reply Media (video/audio) 312*b* the Caller Device uses Secure Real Time Transport Protocol (SRTP) to send an encrypted video reply to the Video Voicemail Server that receives the transmission and prepares it for storage.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments). Any of the above mentioned systems, units, modules, engines, controllers, components, process steps or the like may be and/or comprise hardware and/or software as described herein. For example, the systems, engines, and subcomponents described herein may be and/or comprise computing hardware and/or software as described herein in association with FIGS. 4-7. Furthermore, any of the above mentioned systems, units, modules, engines, controllers, components, interfaces or the like may use and/or comprise an application programming interface (API) for communicating with other systems units, modules, engines, controllers, components, interfaces or the like for obtaining and/or providing data or information.

Figure 4:
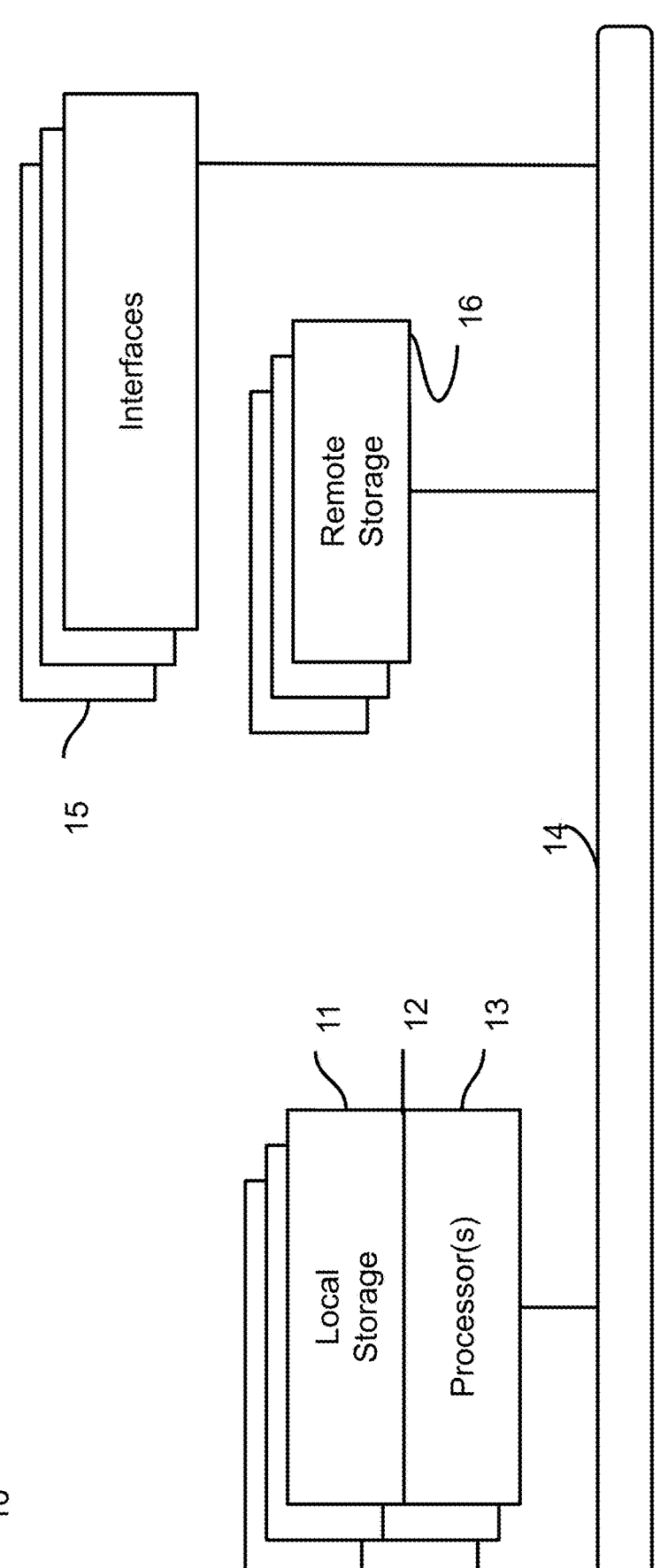
FIG. 4 illustrates one embodiment of the computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAP-DRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
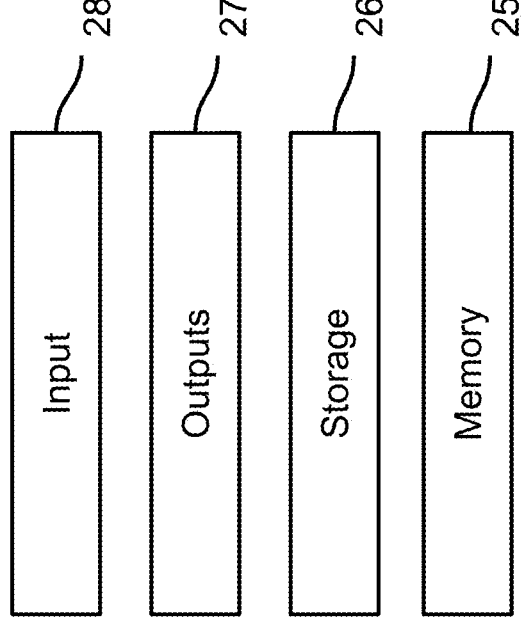
FIG. 5 illustrates components of a system architecture that supports an embodiment of the inventive disclosure.
Figure 5:
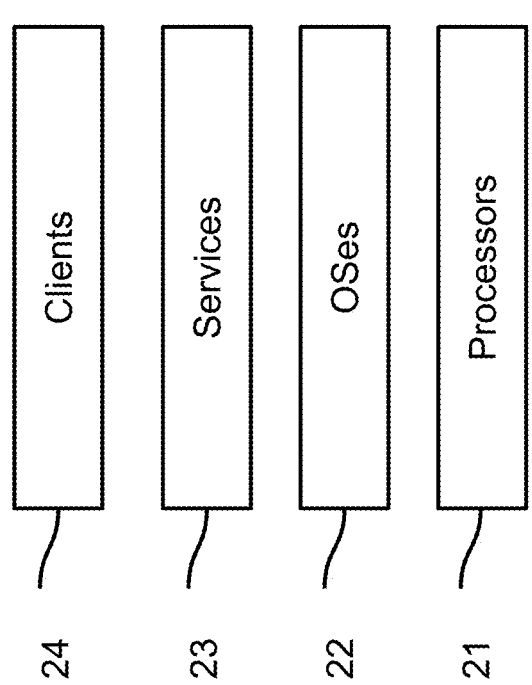

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
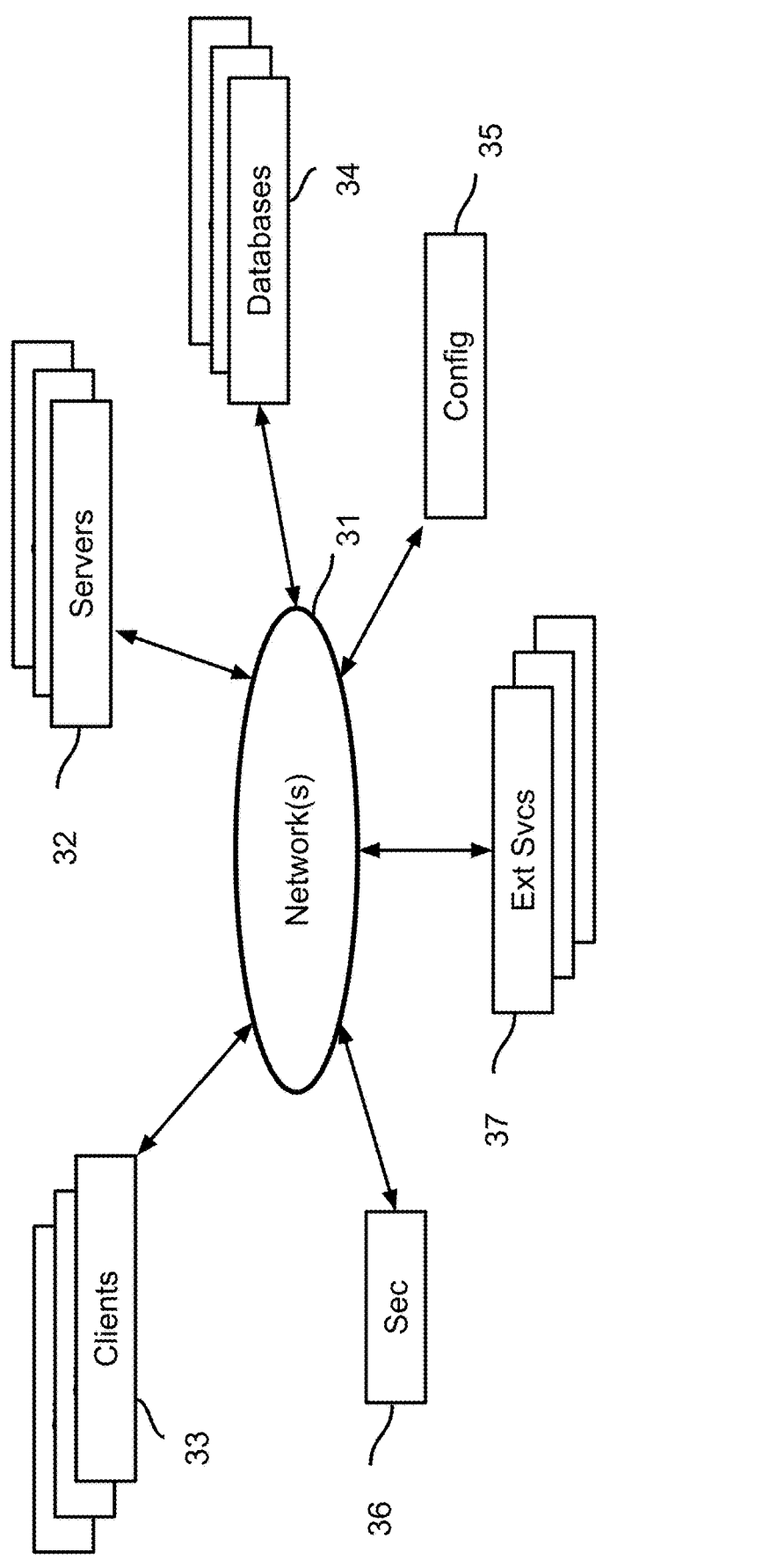
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
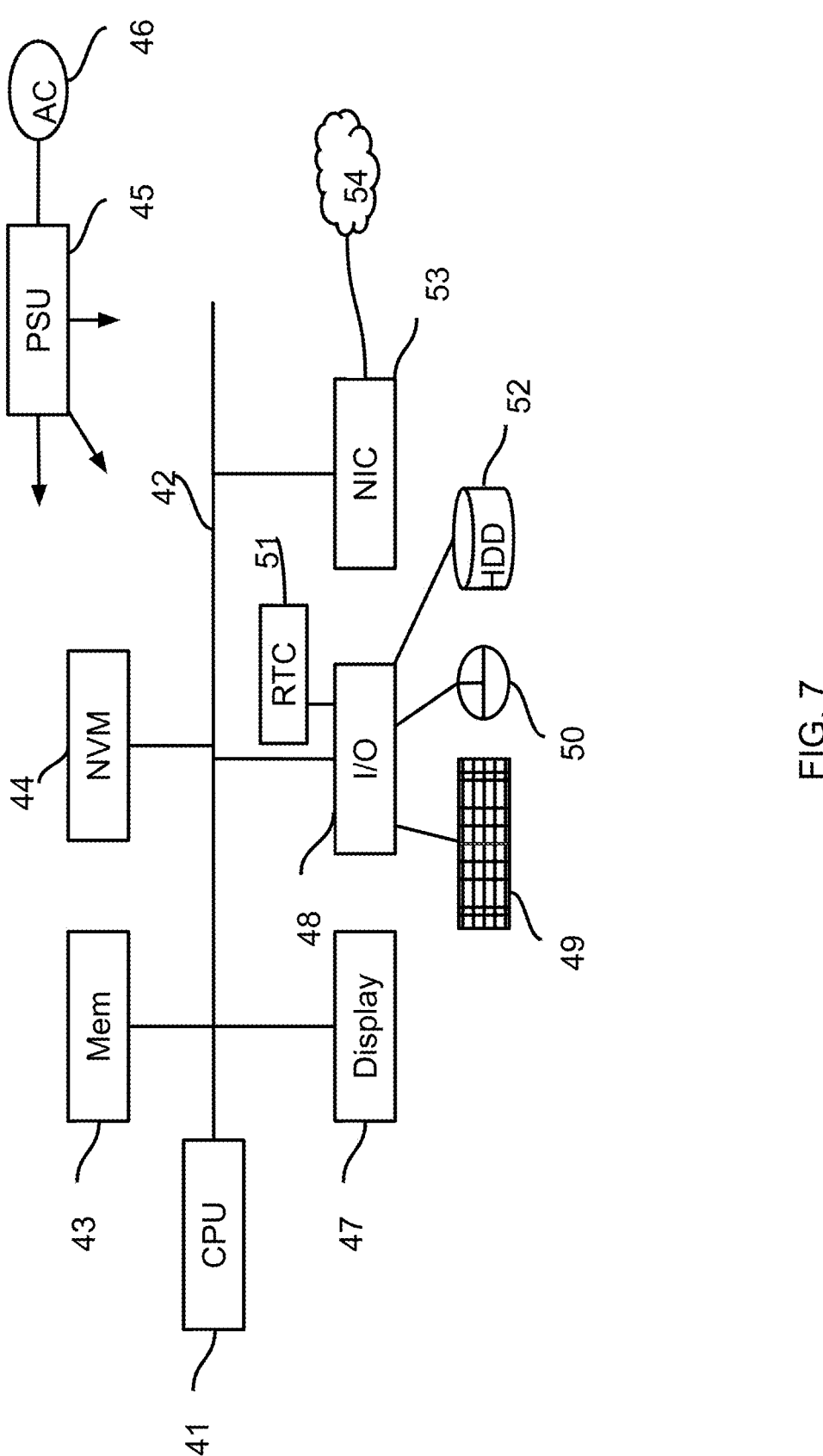
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

ADDITIONAL CONSIDERATIONS

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and/or a process associated with the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer implemented method for managing user communication within a single call session, the computer implemented method comprising:

intercepting and managing, by a server, a communications session initiated by a user device over a communications network, the communications session being initiated between at least a sender user device and a recipient user device, the sender user device associated with a sender address, wherein the intercepting comprises extracting sender address from incoming call signalling and establishing a session identifier that maintains continuity throughout subsequent routing and messaging operations without terminating the video communications session and without establishing a new dialog, connection, or security context;

querying to obtain a recipient user decision tree instructions from a database, wherein the decision tree instructions comprise hierarchical rule structure comprising sender classification rules, time-based routing rules, and/or availability dependent routing rule;

computing an availability status by querying the recipient user device and receiving an availability response from the recipient user device;

algorithmically generating routing instructions by comparing the decision tree instructions, sender address, and the computed availability status, wherein the routing instructions comprise instructions for streaming a pre-recorded message through the server;

selecting a pre-recorded media file from a plurality of pre-recorded media files stored in the database in substantially real time based on user decision tree instructions and sender address;

executing the routing instructions by retrieving the selected pre-recorded media file from the database and streaming the selected pre-recorded media file from the database through the server to an audio/visual interface associated with the sender user device;

wherein the video communication session is maintained without termination throughout the various routing and streaming steps and wherein the various routing and streaming steps are associated with the session identifier from interception to streaming of the selected pre-recorded media file, and wherein the server, the database, the sender user device, and the recipient user device operate with the same session identifier for the entire video communication session; and transmitting a notification to the recipient user device wherein all routing, streaming, and reply capture operations are executed under a single session authority boundary defined by the established session identifier, and wherein no new session authority is created during retrieval or streaming of the prerecorded media file.

2. The computer implemented method according to claim 1, wherein the video communications session is a Session Initiation Protocol, SIP, dialog, and streaming the selected pre-recorded media file further comprises delivering a pre-recorded video as early media by sending a Session Progress with Session Description Protocol (SDP) and streaming the prerecorded video over a negotiated SRTP path without answering toward the caller.

3. The computer implemented method according to claim 2, further comprising capturing a reply in the same session by issuing an in-dialog re-INVITE or UPDATE that requests upstream media from the sender device.

4. The computer implemented method according to claim 1, wherein the decision tree is keyed to the sender address and includes conditions selected from time of day, specific date, caller identity, caller category, and/or a no-message option.

5. The computer implemented method according to claim 1, wherein the selected pre-recorded media file may comprise a pre-recorded video message, a text message sent to the sender through SMS, and/or prompting the sender to record a video message.

6. The computer implemented method according to claim 5, further comprising automatically prompting the sender user device to capture and transmit response data;
and storing the response data on the video-voicemail database.

7. The computer implemented method according to claim 6, wherein the response data comprises recording a video and/or audio message.

8. The computer implemented method according to claim 7, further comprising applying an artificial intelligence processor to generate a written transcript and/or a written description of the video and/or audio message.

9. The computer implemented method according to claim 6, further comprising enabling playback of the response data within a message center on the recipient user device.

10. The computer implemented method according to claim 1, wherein the video communications session is a WebRTC PeerConnection, and streaming the selected pre-recorded media file further comprises injecting a prerecorded video as a remote media track on the existing connection.

11. The computer implemented method according to claim 10, further comprising capturing a reply by replaceTrack and/or addTransceiver to obtain media from the sender device without creating a new connection or performing a new ICE/DTLS handshake.

12. The computer implemented method according to claim 1, further comprising capturing and storing session data in the database, wherein the session data comprises start and end times of calls, the parties involved, and any specific actions taken during the call.

13. The computer implemented method according to claim 12, further comprising enabling access to the call data to an administrator user.

14. The computer implemented method according to claim 12, further comprising calculating billing information based on the call data and automatically generating invoices and/or reports associated with the call data.

15. The computer implemented method according to claim 1, wherein streaming the selected pre-recorded media file to the sender user device further comprises encrypting the prerecorded message prior to transmission.

16. The computer implemented method according to claim 14, wherein encrypting the prerecorded message comprises applying Advanced Encryption Standard (AES), Rivest-Shamir-Adleman (RSA), and/or third party platforms.

17. The computer implemented method according to claim 1, further comprising applying a machine learning algorithm to automatically modify the decision tree in response to the recipient's behavior and/or the responses of the senders to different automated responses.

18. The computer implemented method according to claim 1, wherein the user decision tree instructions further comprise a wait time preference and wherein algorithmically generating routing instructions further comprises a delay based on the wait time preferences.

19. A computing system for managing user communication within a single call session, the computing system comprising:
at least one computing processor; and
memory comprising instructions that, when executed by the at least one computing processor, enable the computing system to:
intercepting and managing, by a server, a communications session initiated by a user device over a communications network, the communications session being initiated between at least a sender user device and a recipient user device, the sender user device associated with a sender address, wherein the intercepting comprises extracting sender address from incoming call signalling and establishing a session identifier that maintains continuity throughout subsequent routing and messaging operations without terminating the video communications session and without establishing a new dialog, connection, or security context;
querying to obtain a recipient user decision tree instructions from a database, wherein the decision tree instructions comprise hierarchical rule structure comprising sender classification rules, time-based routing rules, and/or availability dependent routing rule;
computing an availability status by querying the recipient user device and receiving an availability response from the recipient user device;
algorithmically generating routing instructions by comparing the decision tree instructions, sender address, and the computed availability status, wherein the routing instructions comprise instructions for streaming a pre-recorded message through the server;
selecting a pre-recorded media file from a plurality of pre-recorded media files stored in the database in substantially real time based on user decision tree instructions and sender address;
executing the routing instructions by retrieving the selected pre-recorded media file from the database and streaming the selected pre-recorded media file from the database through the server to an audio/visual interface associated with the sender user device;
wherein the video communication session is maintained without termination throughout the various routing and streaming steps and wherein the various routing and streaming steps are associated with the session identifier from interception to streaming of the selected pre-recorded media file, and wherein the server, the database, the sender user device, and the recipient user device operate with the same session identifier for the entire video communication session; and
transmitting a notification to the recipient user device wherein all routing, streaming, and reply capture operations are executed under a single session authority boundary defined by the established session identifier, and wherein no new session authority is created during retrieval or streaming of the prerecorded media file.

20. A non-transitory computer readable medium comprising instructions that when executed by a processor enable the processor to execute a computer implemented method, the method comprising:

intercepting and managing, by a server, a communications session initiated by a user device over a communications network, the communications session being initiated between at least a sender user device and a recipient user device, the sender user device associated with a sender address, wherein the intercepting comprises extracting sender address from incoming call signalling and establishing a session identifier that maintains continuity throughout subsequent routing and messaging operations without terminating the video communications session and without establishing a new dialog, connection, or security context;

querying to obtain a recipient user decision tree instructions from a database, wherein the decision tree instructions comprise hierarchical rule structure comprising sender classification rules, time-based routing rules, and/or availability dependent routing rule;

computing an availability status by querying the recipient user device and receiving an availability response from the recipient user device;

algorithmically generating routing instructions by comparing the decision tree instructions, sender address, and the computed availability status, wherein the routing instructions comprise instructions for streaming a pre-recorded message through the server;

selecting a pre-recorded media file from a plurality of pre-recorded media files stored in the database in substantially real time based on user decision tree instructions and sender address;

executing the routing instructions by retrieving the selected pre-recorded media file from the database and streaming the selected pre-recorded media file from the database through the server to an audio/visual interface associated with the sender user device;

wherein the video communication session is maintained without termination throughout the various routing and streaming steps and wherein the various routing and streaming steps are associated with the session identifier from interception to streaming of the selected pre-recorded media file, and wherein the server, the database, the sender user device, and the recipient user device operate with the same session identifier for the entire video communication session; and transmitting a notification to the recipient user device wherein all routing, streaming, and reply capture operations are executed under a single session authority boundary defined by the established session identifier, and wherein no new session authority is created during retrieval or streaming of the prerecorded media file.

*  *  *  *  *